(12) United States Patent
Restuccia et al.

(10) Patent No.: US 8,450,225 B2
(45) Date of Patent: May 28, 2013

(54) STRUCTURAL COMPOSITE MATERIAL WITH IMPROVED ACOUSTIC AND VIBRATIONAL DAMPING PROPERTIES

(75) Inventors: Carmelo Luca Restuccia, Chester (GB); Carmelo LoFaro, Gresford (GB)

(73) Assignee: Cytec Technology Corp., Wilmington, DE (US)

( * ) Notice: Subject to any disclaimer, the term of this patent is extended or adjusted under 35 U.S.C. 154(b) by 442 days.

(21) Appl. No.: 12/683,105

(22) Filed: Jan. 6, 2010

(65) Prior Publication Data

US 2010/0170746 A1    Jul. 8, 2010

Related U.S. Application Data

(60) Provisional application No. 61/142,857, filed on Jan. 6, 2009.

(51) Int. Cl.
| | |
|---|---|
| *B32B 5/26* | (2006.01) |
| *B32B 5/28* | (2006.01) |
| *B32B 5/02* | (2006.01) |
| *B32B 17/04* | (2006.01) |

(52) U.S. Cl.
USPC ............ 442/329; 442/327; 442/328; 442/59; 442/172; 442/175; 442/179

(58) Field of Classification Search
USPC .................. 442/25–253, 327–329, 381–384, 442/389, 390
See application file for complete search history.

(56) References Cited

U.S. PATENT DOCUMENTS

| 4,937,125 | A | 6/1990 | Sanmartin et al. |
|---|---|---|---|
| 4,954,382 | A * | 9/1990 | Riefler et al. ................. 428/116 |
| 6,764,754 | B1 * | 7/2004 | Hunter et al. ............... 428/301.4 |
| 7,319,078 | B2 | 1/2008 | Yamaguchi et al. ........... 442/409 |
| 7,434,659 | B2 | 10/2008 | Ayle ............................. 181/292 |
| 2002/0078569 | A1 | 6/2002 | Buge et al. ................. 29/897.32 |
| 2006/0062998 | A1 * | 3/2006 | Taylor et al. ................... 428/364 |
| 2006/0252334 | A1 * | 11/2006 | LoFaro et al. ................. 442/400 |
| 2007/0071957 | A1 | 3/2007 | Atkins et al. |
| 2007/0102239 | A1 | 5/2007 | Liguore et al. ................. 181/292 |
| 2007/0238379 | A1 * | 10/2007 | Bhatnagar et al. ............ 442/135 |
| 2008/0152854 | A1 | 6/2008 | Arellano et al. ............. 428/41.8 |
| 2008/0277057 | A1 * | 11/2008 | Montgomery et al. ..... 156/307.1 |
| 2009/0184200 | A1 | 7/2009 | Lin et al. .......................... 244/1 |

FOREIGN PATENT DOCUMENTS

| EP | 0038091 A1 | 10/1981 |
|---|---|---|
| EP | 0310203 A1 | 4/1989 |
| EP | 0833973 B1 | 4/1998 |
| EP | 1500494 A2 | 1/2005 |
| WO | WO 2007/026411 A1 | 3/2007 |
| WO | WO 2008/147754 A1 | 12/2008 |

OTHER PUBLICATIONS

Net—definition, Textile Glossary, copyright 2001, Celanese Acetate.*
Textile—definition, Textile Glossary, copyright 2001, Celanese Acetate.*
Written Opinion for PCT/GB2010/000008 mailed on Jul. 12, 2011.

* cited by examiner

*Primary Examiner* — Jennifer A Steele
(74) *Attorney, Agent, or Firm* — Thi Dang

(57) ABSTRACT

A composite material comprises a nonwoven layer having a viscoelastic interleaf, which may be positioned mid-ply therein.

8 Claims, 14 Drawing Sheets

$d_1$: Cross head displacement at the initial crack length
$d_2$: Cross head displacement at the final crack length

STRUCTURAL COMPOSITE MATERIAL WITH IMPROVED ACOUSTIC AND VIBRATIONAL DAMPING PROPERTIES This application claims benefit of priority from U.S. provisional application No. 61/142,857 filed Jan. 6, 2009, the content of which is incorporated herein by reference in its entirety.

BACKGROUND OF THE INVENTION

1. Field of the Invention

Composite materials having acoustic and vibration damping properties are disclosed. In particular, composite materials that contain a viscoelastic interleaf are useful, for example, in structures found in aircrafts, such as fuselage skins, stringers and frames. Also contemplated are methods of making the composite material and the structures and aircrafts that contain the composite material.

2. Description of the Related Art

Fiber-reinforced polymer matrix composites (PMCs) are high-performance structural materials that are commonly used in applications requiring resistance to aggressive environments, high strength, and/or low weight. Examples of such applications include aircraft components (e.g. tails, wings, fuselages, propellers), boat hulls, and bicycle frames. PMCs may comprise layers of fibers that are bonded together with a matrix material, such as a polymer resin. The fibers reinforce the matrix, bearing the majority of the load supported by the composite, while the matrix bears a minority portion of the load supported by the composite and also transfers load from broken fibers to intact fibers. In this manner, PMCs may support greater loads than either the matrix or fiber may support alone. Furthermore, by tailoring the reinforcing fibers in a particular geometry or orientation, the composite can be efficiently designed to minimize weight and volume.

Numerous processes have been developed for the manufacture of PMCs. Examples may include wet layup, prepregging, and liquid infusion. In wet layup, the reinforcing fiber is wet with the matrix material, placed into a mold cavity, and allowed to harden or cure. This process may be performed in an automated fashion, such as with a chopper gun or a machine that receives dry fiber rolls, runs them through a resin dip bath, and places the wetted fibers in the mold. Alternatively, the resin may be applied manually using brushes.

In prepregging, composite components are fabricated with pre-impregnated woven fabrics or prepregs. The reinforcing fibers are impregnated with the matrix resin in a controlled fashion and frozen in order to inhibit polymerization of the resin. The frozen prepregs are then shipped and stored in the frozen condition until needed. When manufacturing composite parts from prepregs, the prepregs are, thawed to room temperature, cut to size, and placed in the mold cavity. Once in place, the prepregs are vacuum bagged and cured under pressure to achieve the required fiber volume fraction with a minimum of voids.

The use of advanced composite materials has gained wide acceptance over the last few decades because of their high strength-to-weight and stiffness-to-weight ratios. Advanced composite materials show higher stiffness but inferior damping performance and compared with metals and metal-matrix composites. Thus, there is a need for advanced composite materials having an enhanced damping capacity of a composite structural system with little reduction in stiffness and strength.

SUMMARY OF THE INVENTION

In some embodiments, a cured or uncured structural composite material comprises a structural component; a resin component; and a viscoelastic interleaf; wherein the structural component is in a form of a plurality of layers of textile that comprises structural fibers; wherein the viscoelastic interleaf comprises at least one thin layer of nonwoven material positioned between a pair of adjacent layers of the textile; wherein the viscoelastic interleaf and structural component are partially or completely impregnated with the resin component; and wherein upon curing the interlayer is integrated in the structural composite material. In some aspects, the resin component may be a thermosetting composition. In some aspects, the structural fibers comprise carbon fibers.

In some aspects, the nonwoven interleaf is embedded in the resin composition prior to the curing process. In some aspects, the nonwoven material comprises at least one thermoplastic elastomer or a blend thereof, and/or at least one thermoplastic polymer or copolymer and/or blend thereof. In other aspects, the nonwoven material comprises at least one copolymer selected from the group consisting of styrenic thermoplastic elastomers, elastomeric polyolefins and a blend thereof. Further, in other aspects the nonwoven material comprises a thermoplastic selected from the group consisting of polyesters, polyamides, polyolefins and a blend thereof.

In some embodiments, the viscoelastic interleaf may be treated by plasma to achieve a surface tension of at least 35 dyne/cm on both the sides. In some further aspects, the viscoelastic interleaf is co-cured with the plurality of layers of textile. In some aspects, the nonwoven material has a controlled interface with the resin resulting in a peel strength value within the 70% of the value of the unmodified composite. In other aspects, the interleaf is positioned in the area of maximum shear of the composite. In some aspects, the viscoelastic interleaf is positioned in between each layer of textile. The viscoelastic interleaf may be in the mid plane of the structural composite material and/or positioned in areas proximate the maximum level of shear.

The viscoelastic interleaf may comprise organic or inorganic modifiers, fillers or inclusions, and/or organic and/or other inorganic compounds, such as flow control additives, UV absorbers, fillers, metal particles, deglossing agents, pigments, antioxidants, flame retardants, diluents, stabilizers, monomers, prepolymers, flexibility improvers, processing aids and lubricants, fluoropolymer-based processing aids, mineral oils and waxes, nucleating agents, fiber strands, polymers, glass, ceramic and polymeric bubbles, metal particles, micro and nanofillers, core-shell particles, elastomeric micro and nanoparticles, magnetic and dielectric nanocrystals, carbon nanotubes, carbon nanofibers, nanographite, nanoclays, nanosilica, nanoalumina, zirconia and titania nanoparticles, noble metal and conductive nanoparticles, nanofibers and nanostrands or a combination thereof.

In some aspects, the viscoelastic interleaf does not cause a reduction of more than 10% of the composite glass transition temperature and/or does not cause a reduction of more than the 10% of the compression after impact strength of the composite. In further aspects, the viscoelastic interleaf may cause a reduction of at least 10% of the composite damage area.

In other aspects, MEK immersion for 1 hour does not cause a reduction of more than the 10% in the nonwoven modified composite interlaminar shear strength.

In further aspects, the viscoelastic interleaf does not cause a reduction of more than the 10% in the composite open hole compression strength.

In another embodiment a cured or uncured damping composite structural material comprising a viscoelastic fabric and a resin component is disclosed wherein the viscoelastic fabric can comprise at least one thin layer of nonwoven; wherein the nonwoven material comprises at least one copolymer selected from the group consisting of styrenic thermoplastic elastomers, elastomers, elastomeric polyolefins and a blend thereof; wherein the viscoelastic fabric is partially or totally impregnated by the resin component, wherein the resin component can be a thermosetting resin.

In some aspects the nonwoven material comprises or further comprises a thermoplastic selected from the group consisting of polyesters, polyamides, polyolefins, copolymers and a blend thereof.

In some aspects the viscoelastic nonwoven comprises organic or inorganic modifiers, fillers or inclusions.

In some aspects the additional organic and inorganic compounds are selected from the group consisting of flow control additives, UV absorbers, fillers, metal particles, deglossing agents, pigments, antioxidants, flame retardants, diluents, stabilizers, monomers, prepolymers, flexibility improvers, processing aids and lubricants, fluoropolymer-based processing aids, mineral oils and waxes, nucleating agents, fiber strands, polymers, glass, ceramic and polymeric bubbles, metal particles, micro and nanofillers, core-shell particles, magnetic and dielectric nanocrystals, carbon nanotubes, carbon nanofibers, nanographite, nanoclays, nanosilica, nanoalumina, zirconia and titania nanoparticles, noble metal nanoparticles, conductive micro and nanoparticles, nanofibers and nanostrands or a combination thereof.

In some aspects the viscoelastic fabric is coated at least on one side with a structural adhesive formulation.

In some aspects the viscoelastic interleaf is treated by plasma to achieve a surface tension of at least 35 dyne/cm on both the sides.

In another embodiment a cured or uncured composite sandwich structure comprising at least first and second skins; at least a structural core; a resin component; and a viscoelastic interleaf; wherein the skins are composed by a plurality of layers of textile, that comprises structural fibers, and a resin component; wherein the resin component can be a thermosetting resin system; wherein the viscoelastic interlayer can comprise at least one thin layer of nonwoven material positioned between a pair of adjacent layers of the textile in the skins; wherein the viscoelastic interleaf can comprise at least one layer of nonwoven between the skins and the honeycomb core; wherein the viscoelastic interlayer and structural component are partially or completely impregnated with the resin component; wherein upon curing the interlayer is integrated in the structural composite structure; wherein the interleaf is positioned in the area of maximum shear of the outer composite skins; wherein the structural fibers comprise carbon fibers; wherein the viscoelastic interleaf is embedded in the resin composition prior to the curing process; wherein the nonwoven material comprises at least one thermoplastic elastomer or a blend thereof; wherein the nonwoven material comprises at least one thermoplastic polymer or copolymer and/or blend thereof; wherein the nonwoven material comprises at least one copolymer selected from the group consisting of styrenic thermoplastic elastomers, elastomeric polyolefins and a blend thereof; wherein the nonwoven material comprises or further comprises a thermoplastic selected from the group consisting of polyesters, polyamides, polyolefins, copolymers and a blend thereof; wherein the viscoelastic interleaf is treated by plasma to achieve a surface tension of at least 35 dyne/cm on both the sides.

In another embodiment an interleaf supported adhesive material for structural applications having vibration and/or acoustic damping performance is disclosed. It comprises a resin component and a viscoelastic interleaf; wherein the nonwoven material comprises at least one copolymer selected from the group consisting of styrenic thermoplastic elastomers, elastomeric polyolefins and a blend thereof; wherein the nonwoven material comprises or further comprises a thermoplastic selected from the group consisting of polyesters, polyamides, polyolefins, one of their copolymers and a blend thereof; wherein the viscoelastic interleaf is partially or completely impregnated with the resin component; wherein the resin component is a thermosetting resin; wherein the viscoelastic interleaf is coated at least on one side with a structural adhesive formulation; wherein the viscoelastic interleaf is treated by plasma to achieve a surface tension of at least 35 dyne/cm on both the sides.

In another embodiment, a method of making a prepreg or the structural composite material comprises partially or fully co-curing the viscoelastic interleaf; and a prepreg comprising the resin component and the structural component in a lay-up, wherein the lay-up comprises stacked layers of plies of the prepreg integrated with the viscoelastic interleaf, to form the prepreg or structural composite material. The method may also further comprise integrating the viscoelastic interleaf and stacked plies of the prepreg to form a layup, wherein the viscoelastic interleaf is integrated in selected areas of the layup. In some aspects, the method may comprise combining the viscoelastic interleaf and the structural component with the resin component, such as by impregnating, injecting or infusing the resin component. Injecting may comprise using a bag, a mandrel and/or mould and optionally using channels to assist flow. The method may also comprise curing the layup or combination for a period suitable for gelling and/or curing of the resin component.

DETAILED DESCRIPTION OF THE PREFERRED EMBODIMENT

Figure 1:
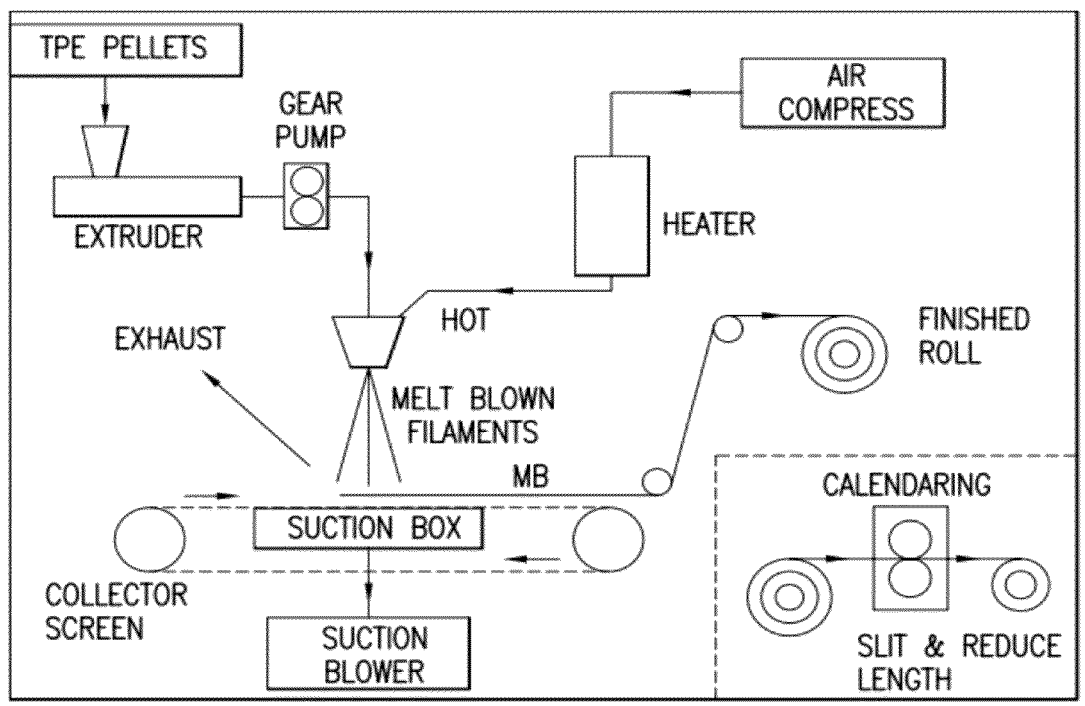
FIG. 1 is an illustration of one embodiment of the manufacturing process of nonwoven fabrics relating to the melt blowing process.

The recent increase in the use of advanced materials in the aerospace industry has lead to a renewed interest in acoustic and vibration damping of commercial and military aircraft and spacecraft primary and secondary structures. Composite materials are inherently lighter and stiffer than metals, thus tending to be more susceptible and to experience undesirable levels of vibration and noise.

Active and passive damping techniques and devices have been developed to improve performance in the area of dynamic load reduction, vibration and noise reduction in composite structures. Standard solutions include constrained structures containing passive damping layers formed of viscoelastic materials (VEMs) that are attached to the emitting surface and stiffened by an outer composite/metal layer. These constrained structures dampen vibration and noise by shifting the phase of loading from that of the underlying structure, through a combination of bulk tension/compression and localized shear deformation within the applied material at the underlying structure interface.

One disadvantage of the use of VEMs is the considerable weight added to the underlying structure, resulting in poor weight efficiency for aircraft and spacecraft systems and in additional assembly and labor costs.

The automotive industry has extensively used multilayered add-on, in contrast to integrated, acoustic damping devices to reduce noise, improving cruise comfort in vehicles. Viscoelastic continuous films, foams and nonwoven fabrics with different composition and containing several additives have been used for these applications. Noise reducing materials comprising a noise reducing laminate composed of multiple layers, wherein the noise reducing laminate includes acoustic material composed of an organic fiber nonwoven fabric layer and superimposed on at least one major surface thereof, skin material, and wherein air layer is disposed between the noise reducing laminate and a car planar body part has been presented (WO2007/026411A1). In this case sound longitudinal waves are attenuated by a series of reflection-transmission mechanisms due to the inhomogeneous structure while shear waves are hardly dissipated. Organic microfibers and heat activated staple fibers with sufficient structural integrity without the use of a second layer have been proposed for large household appliance, walls of houses, airplanes (in dual walled cabin or between the engine and the cabin) and boats (EP0833973B1 and WO97/00989). Combinations of filaments having different damping responses to mechanical vibrations and embedded in a resin matrix have been proposed for machine housing and sport appliances (EP0310203).

Composite materials for acoustic and mechanical damping containing a plurality of layers of fibrous material embedded in a structural matrix material and containing in between them viscoelastic perforated material films are discussed in US Patent Application 2007/0071957. In this case the structural matrix is continuous through the perforations between the adjacent layers of fibrous material embedded in the structural matrix. Therefore, the at least partial continuous nature of the film acts as a barrier to resin flow, which is not suitable for infusion processes. In contrast, the embodiments described herein contain an interlayer made of a discontinuous nonwoven material that does not act as a barrier to resin flow. In one aspect, the nonwoven material is made from random fibers that allow resin to flow through the interlayer. The resulting composite material therefore exhibits greater strength than material having an interlayer made from a continuous or partially continuous film.

US Patent Application 2008/0277057 A1 (The Boeing Company) refers to a damped composite laminate including an interlayer that may include a viscoelastic material having a reinforcement medium, wherein the reinforcement medium may be fibers embedded in the viscoelastic material, which fibers themselves may be formed of a second viscoelastic material. The viscoelastic material in which the fibers are embedded have a lower glass transition temperature Tg than the viscoelastic fibers, that enables the fibers to act as a reinforcement medium. In contrast, in the embodiments described herein, the resin has a Tg that is higher than the viscoelastic material of the interleaf Thus, a reinforcement medium is not required or necessary in the embodiments disclosed herein. Further, unlike aspects of the embodiments disclosed herein, the viscoelastic material in which the reinforcement fibers are embedded is similar to the viscoelastic films discussed above in relation to US Patent Application 2007/0071957.

Patent application WO 2008/147754 A1 (The Boeing Company) discusses a damped composite structure formed from a matrix material and a plurality of shape memory alloy wire fibers held in a material matrix for damping the structure. The matrix material can include a layer of resin containing an interlayer of viscoelastic material in which a group of wire fibers are embedded. The wire fibers disadvantageously add to the weight of the material. In addition, the material is difficult to manufacture. In contrast, the embodiments herein do not require wire fiber to achieve damping.

Patent application US 2008/0152854 (3M Innovative Properties Company) recites a damping tape comprising: 1) a backing comprising a thermoplastic film having front and rear major surfaces and a sheet of resilient fibers having anchor portions bonded to the film at bonding locations spaced along the front surface of the backing, and arcuate portions projecting from the front surface of backing between the bonding locations and 2) a layer of adhesive covering significant portions of the rear surface of the backing This damping tape is not integrated with the rest of the structure, unlike embodiments described herein.

Sandwich structures with acoustic/vibration damping properties were developed for several aircraft components such as engine nacelles, floor panels and wing-to-body fairings.

Sandwich acoustic panels comprising a resistive layer forming a wave acceptor front face of the panel, a compartmentalized structure formed at least by two honeycomb cores separated by a porous layer and a back reflector are discussed in Patent Application US 2002/0078569 A1 (Airbus France). In this case the porous layer is fitted with a series of tubular guides on each of its faces to some of the cells of the compartmentalized cores.

In U.S. Pat. No. 7,434,659 B2 (Hexcel Corporation) an acoustic structure including a honeycomb core having cells in which septum caps are located is disclosed. The cap has a resonator portion that extends transversely across said cell and an anchoring portion which is anchored to the honeycomb cells by an adhesive.

Patent application US 2007/0102239 (The Boeing Company) recites an integrally damped composite aircraft floor panel comprising a honeycomb core element sealed by an upper face sheet impregnated with an upper epoxy resin and a lower damping face sheet infused with a highly damped lower epoxy resin.

Patent application US 2009/0184200 (The Boeing Company) refers to a structure comprising a honeycomb core, which contains damping foam and particles, sandwiched between to composite laminates.

Traditional material solutions do not fulfill all current composite material requirements. Examples of such requirements may include weight, material flexibility, moldability, drapability, handleability, processability, and suitability for composite manufacture (including infusion and automated fiber placement processes). These solutions are limited in terms of the weight savings and shapes they may adopt due to the inherent nature of the materials used (mainly vulcanized rubber). These materials have to be manually applied to the structure resulting in additional work labor, time, and maintenance costs. Furthermore, some materials may cause a significant reduction (more than 20%) in one or more mechanical properties.

In one embodiment of the invention, a material solution can be easily manufactured in any required shape and feature (e.g., fiber diameter, area to weight ratio, thickness, air permeability and tensile properties) and integrated into the structure to be damped. Such solutions are suitable to current composite manufacturing processes, including infusion and automated fiber placement. The damping material can be applied during the manufacture of monolithic or sandwich fuselage skin and fuselage frames without additional production steps and, if required, can be applied only to critical parts of the final components, reducing weight and costs.

An integrated structural material having improved acoustic damping properties may include a composite laminate having a viscoelastic material in the area of maximum shear. Surface treatments, position and shear mechanisms maximize the acoustic waves/vibrations dissipation into heat. Both the composition of the viscoelastic material as well as its positioning may contribute to the acoustic and mechanical properties of the composite. In one embodiment, a controlled interface between the viscoelastic interleaf and the resin results in excellent performance.

A controlled interface as used herein has its ordinary definition as known to those skilled of the art and refers to an integrated structure with the following features: 1) A peel strength value within the 70% of the value of the unmodified composite; and 2) A nonwoven maintaining a certain level of integrity of the acoustic damping properties despite some interaction with the resin matrix. The nonwoven maintains certain interconnectivity and does not result in isolated patches.

The terms "approximately," "about," and "substantially" as used herein represent an amount close to the stated amount that still performs the desired function or achieves the desired result. For example, the terms "approximately", "about" and "substantially" may refer to an amount that is within less than 10% of, within less than 5% of, within less than 1% of, within less than 0.1% of, and within less than 0.01% of the stated amount.

The term "partially" or "at least a portion of" as used herein represents an amount of a whole that comprises an amount of the whole that may include the whole. For example, the term "a portion of" may refer to an amount that is greater than 0.01% of, greater than 0.1% of, greater than 1% of, greater than 10% of, greater than 20% of, greater than 30% of, greater than 40% of, greater than 50% of, greater than 60% of, greater than 70% of, greater than 80% of, greater than 90% of, greater than 95% of, greater than 99% of, and 100% of the whole.

The term "integrated" as used herein has its ordinary meaning as known to those skilled in the art and refers to damped structures that contain a combination of elements in a structure that functions cooperatively and in which any element is an intimate part of the main structure and is not easily separable, and in one aspect cannot be in any way separated. In some embodiments, an integrated damped structure includes composites that are co-cured with the nonwoven damping material. In other embodiments, the resin component penetrates the nonwoven material partially or substantially completely. Thus, the structural resin composition is continuous or partially continuous throughout the composite structure. Upon heating, a partial diffusion and intermingling of the interleaf within the resin matrix can be obtained further improving the strength of the final composite and to form an integrated structure.

The term "co-cured" as used herein has its ordinary meaning as known to those skilled in the art and includes material that is cured in a single step. For example, in a prepreg having an interleaf partially or completely impregnated with resin may be co-cured or cured in a single step. In some embodiments, co-curing the interlayer having the nonwoven material with the remainder of the components in the composite material results in an integrated structure.

The nonwoven material can be used for different manufacturing processes. The nonwoven material may also be used to make prepregs.

In one embodiment, the nonwoven viscoelastic material and the fiber or preform may be infused with resin simultaneously or during the same infusing process yielding an integrated structure. In this embodiment, the viscoelastic layer is not a continuous film or a partially continuous film acting as a flow barrier that is embedded in a structure.

The term "structural component" as used herein has its ordinary meaning as known to those skilled in the art and includes a material comprising structural fibers and which is in the form of a plurality of layers of textile, such as woven carbon fiber fabric.

The term "structural fiber" as used herein includes fibers which add to the strength of the ultimate composite such as glass or carbon fibers and which therefore have a modulus of elasticity greater than 50 GPa.

The term "resin component" as used herein has its ordinary meaning as known to those skilled in the art and includes a structural resin composition suitable for making fuselage skins, stringers and frames.

The terms "matrix," "resin," and "matrix resin" as used herein have their ordinary meaning as known to those skilled in the art and may include one or more compounds comprising a thermoset and/or thermoplastic materials. Examples may include, but are not limited to, epoxies, epoxy curing agents, phenolics, phenols, cyanates, imides (e.g., polyimides, bismaleimide (BMI), polyetherimides), polyesters, benzoxazines, polybenzimidazoles, polybenzothiazoles, polyamides, polyamidimides, polysulphones, polyether sulphones, polycarbonates, polyethylene terepthalates, and polyether ketones (e.g. polyether ketone (PEK), polyether ether ketone (PEEK), polyether ketone ketone (PEKK) and the like), combinations thereof, and precursors thereof.

Beneficially, the use of an integrated damped structure results in a significant weight savings of the damping element, and reduces maintenance costs, parts count and labors costs. In addition, the reduction in noise may result in further weight and cost savings by minimizing secondary damping treatments used in an aircraft fuselage, such as oversized glass wool blankets, trimmings, and other installation devices.

The terms "damped" or "damping" as used herein has its ordinary meaning as known to those skilled in the art and includes the dissipation of mechanical energy of a vibrating structure. Energy dissipation may include conversion of mechanical energy into thermal energy which is then lost to a structure's environment. In one embodiment, damping is passive-based material damping or viscoelastic damping. In one embodiment, the composite laminate shows high damping properties, for example, a high loss factor-η), over a wide range of frequencies and temperatures. Suitable frequencies include about 200-5000 Hz. Suitable temperatures include about −50° C. to +20° C., such as −40° C. to +10° C., −30° C. to +20° C., −20° C. to +10° C. −10° C. to +20° C., or 0° C. to +10° C.

The term "prepreg" as used herein has its ordinary meaning as known to those skilled in the art such as described above. Prepregs include sheets or lamina of fibers that have been impregnated with a matrix material within at least a portion of their volume. The matrix may be present in a partially cured state. In one embodiment, the prepreg has a fiber volume fraction between about 0.50 to 0.60 vol. %, on the basis of the total volume of the prepreg.

The terms "cure" and "curing" as used herein have their ordinary meaning as known to those skilled in the art and may include polymerizing and/or cross-linking processes. Curing may be performed by processes that include, but are not limited to, heating, exposure to ultraviolet light, and exposure to radiation. In certain embodiments, curing may take place within the matrix. Prior to curing, the matrix may further comprise one or more compounds that are, at about room temperature, liquid, semi-solid, crystalline solids, and combinations thereof. In further embodiments, the matrix within the prepreg may be partially cured in order to exhibit a selected stickiness or tack.

The term "composites" as used herein each has its ordinary meaning as known to those skilled in the art such as described above. Composites may include plurality of prepregs. Prepregs may be consolidated into composites by applying at least one of heat, vacuum, and external pressure. The resulting composites can be used (but not limited to) in aerospace applications.

Embodiments of the composites described herein have an apparent interlaminar shear strength that is not substantially affected by the solvent methyl ethyl ketone (MEK) conditioning. In some embodiments 90% of this shear strength is retained after MEK conditioning, e.g., 90%, 91%, 92%, 93%, 94%, 95%, 96%, 97%, 98%, 99%, or 100%. For example, an one embodiment, the interlaminar shear strength of a composite before MEK conditioning, e.g. 90%, 91%, 92%, 93%, 94%, 95%, 96%, 97%, 98%, 99%, or 100% is about 84.59 and after methylethylketone treatment is about 83.34.

The phrase "shear strength" as used herein has its ordinary meaning as known to those skilled in the art. Specimens may be tested in shear in a variety of ways. In one embodiment, the apparent shear strength is the maximum shear stress calculated at half thickness of a test specimen at the moment of first failure and may be measured through flexure, such as 3-point bending. The shear strength in 3-pt bending may be given by $$\tau = \frac{3 \cdot P_R}{4 \cdot b \cdot h}$$

wherein $P_R$ is the maximum force at the moment of the first failure, b is the width of the specimen, and h is the thickness of the specimen.

The term "fiber" as used herein has its ordinary meaning as known to those skilled in the art and may include one or more fibrous materials adapted for the reinforcement of composites. Fibers may take the form of any of particles, flakes, whiskers, short fibers, continuous fibers, sheets, plies, and combinations thereof. Continuous fibers may further adopt any of unidirectional, multi-dimensional (e.g. two- or three-dimensional), non-woven, woven, knitted, stitched, wound, and braided configurations, as well as swirl mat, felt mat, and chopped mat structures. Woven fiber structures may comprise a plurality of woven tows having less than about 1000 filaments, less than about 3000 filaments, less than about 6000 filaments, less than about 12000 filaments, less than about 24000 filaments, less than about 48000 filaments, less than about 56000 filaments, less than about 125000 filaments, and greater than about 125000 filaments. In further embodiments, the tows may be held in position by cross-tow stitches, weft-insertion knitting stitches, or a small amount of resin, such as a sizing.

The composition of the fibers may be varied, as necessary. Embodiments of the fiber composition may include, but are not limited to, glass, carbon, aramid, quartz, polyethylene, polyester, poly-p-phenylene-benzobisoxazole (PBO), boron, silicon carbide, polyamide, and graphite, and combinations thereof. In one embodiment, the fiber is carbon, fiberglass, aramid or other thermoplastic materials. The reinforcing fibers may be organic or inorganic. Further, the fibers may include textile architectures including those that are either continuous or non-continuous in form.

The term "nonwoven" as used herein has its ordinary meaning as known to those skilled in the art and may include a fibrous, self-bonding web that is not woven. In one embodiment, "nonwoven" refers to any material which has been formed without the use of textile weaving processes that produces a structure of individual fibers that are interwoven in an identifiable manner. The nonwoven fabric can be made from short or long fibers. Nonwoven material may be suitable for resin infusion processes as the nonwoven material allows the resin to flow due to the controlled permeability of the nonwoven. In contrast, continuous or perforated VEM films create a physical barrier to resin flow. Nonwoven materials include wet-laid, dry-laid (carded, airlaid), spunmelt (spun-laid, meltblown), flash spun, electrostatic spun, water-jet-punched, needle punched structures. Representative polymers for the nonwoven include polyolefins such as low, medium and high density polypropylene, low, medium and high density polyethylene, atactic, sindiotactic or isotactic polypropylene and blends thereof, polyethylene vinyl alcohol and blends thereof, polybutylene as poly(1-butene), and poly (2-butene), poly(3-methyl-1-butene), poly(1-butene), and poly(2-butene), poly(4-methyl-1-pentene), poly(1-hexene), poly(1-heptene), poly(1-octene), poly(1-nonene), poly(1-decene), polyolefinic copolymers and polyolefinic thermoplastic elastomers and blends thereof polyesters such as polyethyleneterephthalate (PET) and polybuthyleneterephthlatate (PBT), polyether ester copolymers; polyamides such as nylon 6 or nylon 66, polyamide polyether copolymers; polyurethanes and polyether and ester based polyurethane thermoplastic elastomers; polystyrene block copolymers containing polybutadiene, polyisoprene, hydrogenated polybutadiene, hydrogenated polyisoprene or a combination thereof; vinyl polymers and copolymers such as polyvinylchloride, polyvinylidene chloride, polyvinylalcohol and polyethylenevinylacetate, acrylic polymers and copolymers, polycarbonates, polytetrafluoroethylene, and other polymers now known or later developed and blends thereof.

The nonwoven microfibers may be constituted by bi or multicomponent fibers. Microfibers may have more complex structures such as sheath/core, side/side, pie segments, islands-in-a-sea and they may be made of different polymers or blends thereof. Polymer microfibers may contain organic or inorganic fillers or modifiers.

The surface of the nonwoven may be subject to a pretreatment such as a chemical treatment, a plasma treatment, a corona discharge treatment, a flame treatment, blasting or a combination thereof for the purpose of improving or enhancing the adhesive strength and the mechanical interlocking mechanisms. In some aspects, the viscoelastic interleaf is treated by plasma to achieve the surface tension of the least 35 dyne/centimeters on both sides.

The term "interleaf" as used herein has its ordinary meaning as known to those skilled in the art and includes a layer placed between other layers. In one embodiment, the interleaf may be positioned in the middle of a plane of a composite. In another embodiment, the mid-ply comprises the area of maximum shear. In a simple case shear and flexure can be determined by stress analysis of structure. For example, in the case of a beam loaded in flexure the area of maximum shear is at the neutral axis. In more complex structures additional calculations are required to determine the stress and to identify the area of maximum shear.

In another embodiment, the interleaf has a thickness of 20-2000 μm, preferably between 50-700 μm and most preferably between 100-300 μm.

The term "mid-plane" as used herein has its ordinary meaning as known to those skilled in the art and includes the portion in the middle of a ply of a composite that may be located at a distance of approximately 40 to 60% of the thickness of the composite from one or more surfaces of the composite.

The term "maximum shear" as used herein has its ordinary meaning as known to those skilled in the art and includes an internal force tangential to the section on which it acts resulting from applied forces that causes or tends to cause two contiguous layers to slide relatively to reach other in the direction parallel to their plane of contact. The shear stress from bending is maximum on the midplane of the beam at the neutral axis. In some embodiments, the interleaf is positioned between layers of textile in the midplane of the integrated damped composite material, and in some aspects such positioning creates a more weight- and damping-efficient structure in areas selected on the level of shear.

In some embodiments, the interleaf may be placed in any layer constituting the composite structure, and in other embodiments the interleaf may be positioned in specific areas of the composites and in some aspects the interleaf may be positioned in areas selected on the level of shear to create more weight- and damping-efficient structure.

In one embodiment, the interleaf, which may be a discontinuous viscoelastic layer, is positioned in a composite such that a "controlled interface" is achieved.

The term "embedded" as used herein has its ordinary meaning as known to those skilled in the art and includes an interleaf which is fully included within the composite structure. In some aspects, the interleaf is an integral part of the composite structure.

The term "viscoelastic" as used herein has its ordinary meaning as known to those skilled in the art and may include a material that both viscous and elastic characteristics when undergoing deformation. Viscoelastic materials have elements of both of these polymer classes and, as such, exhibit time dependent strain. Whereas elasticity is usually the result of bond stretching along crystallographic planes in an ordered solid, viscoelasticity is the result of the diffusion of atoms or molecules inside of an amorphous material.

Elastomers are usually thermosets in which the long polymer chains cross-link during curing (vulcanization process). The elasticity is derived from the ability of the long chains to reconfigure themselves to distribute an applied stress. The covalent cross-linkages ensure that the elastomer will return to its original configuration when the stress is removed. As a result of this extreme flexibility, elastomers can reversibly extend from 5-800%, depending on the specific material. Without the cross-linkages or with short, uneasily reconfigured chains, the applied stress would result in a permanent deformation.

Thermoplastic elastomers (TPE) are a class of copolymers or a physical mix of polymers showing both thermoplastic and elastomeric properties. While most elastomers are thermosets, thermoplastics are in contrast relatively easy to use in manufacturing, for example, by injection molding and meltblowing. Thermoplastic elastomers show both advantages typical of rubbery materials and plastic materials. The principal difference between thermoset elastomers and thermoplastic elastomers is the type of crosslinking. The crosslink in thermoset polymers is a covalent bond created during the vulcanization process. On the other hand the crosslink in thermoplastic elastomer polymers is a weaker dipole or hydrogen bond or takes place in only in one of the phases of the material.

Typical nonwoven of the embodiments described herein are made of materials exhibiting a viscoelastic behavior. In particular the loss tangent (tan δ) is one of factors used for determining sound and vibration damping efficiency. Thus as the high damping nonwoven composition has a higher figure of the factor, a dynamic energy is absorbed and dissipated in the form of electric or thermal energy, and the interleaf exhibits an excellent mechanical characteristics such as acoustic absorbing properties, or vibration damping properties. A conventional high damping interleaf material composition is required to have a loss tangent higher than 1.0 and preferably between 1.5 and 2.0.

In addition the interleaf composition is chosen to ensure the suitability for nonwoven manufacturing processes, low moisture uptake and solvent and aggressive fluids resistance.

In one embodiment, thermoplastic elastomers may be used to provide a balance between processability and compatibility/mechanical/solvent resistance properties. In one embodiment, the viscoelastic material is a styrenic thermoplastic elastomer. The viscoelastic material may be a diblock or triblock of polystyrene and flexible elastomeric block. Other viscoelastic materials include styrene block type copolymers, for example having polystyrene blocks and a vinyl bonded rich poly-isoprene. One such example may include the triblock copolymer Hybrar 7311.

In one embodiment, the viscoelastic material comprises styrenic thermoplastic elastomers (TPE-S). Type S thermoplastic elastomers are a class of block copolymers containing two incompatible blocks, namely, an elastomeric segment with a lower Tg and styrenic segments with higher $T_g$, which form a microphase separated structure at room temperature. The material can be considered as an elastomeric matrix physically vulcanized by the aggregation of polystyrene (PS) end blocks, which also act as reinforcing filler. Type S thermoplastic elastomers provide opportunities for improvement of damping over a wide range of temperatures and frequencies, as the microseparation behavior has a positive impact on damping.

TPE-S has excellent damping properties across a wide range of temperatures and frequencies. Styrenic block copolymers having a flexible block may include hydrogenated poly(styrene-b-isoprene-b-styrene) (SEPS), a copolymer of a polystyrene and ethylene-butylene (SEBS), a copolymer of a polystyrene and ethylene-ethylene-propylene (SEEPS), a copolymer of a polystyrene and isoprene (SIS), a copolymer of a polystyrene and butadiene (SBS), and a copolymer of a polystyrene and isoprene-butadiene (SIBS) or a blend thereof.

Embodiments of the interleaf described herein can be manufactured into various shapes having various features, such as fiber diameter, area/weight, thickness, air permeability and tensile properties. For example, the fiber diameter of the fiber in the composite may be about 10-20 μm, and in other embodiments 3-7 μm, 20-40 μm, or 40-60 μm. In addition, the mass per unit area of interleaf may be about 50-150 g/m$^2$, and in other embodiments 10-50 g/m$^2$, 150-300 g/m$^2$, or 300-500 g/m2. Also, the thickness of the interleaf may be about 100-400 μm and in other embodiments 50-100 μm, 400-600 μm, or 600-1000 μm. The air permeability of the interleaf may be about 40-100 cc/cm$^2$/sec and 5 to 40 cc/cm$^2$/sec and in another embodiment 100 to 400 cc/cm$^2$/sec. For example, the tensile strength MD of the interleaf may be about 2-10 N/1.5 cm, and in other embodiments 10-20 N/1.5 cm, 20-60 N/1.5 cm, or 60-100 N/1.5 cm.

In one embodiment, the insertion of the viscoelastic interleaf in the composite laminate does not significantly affect the thermal properties ($T_g$), the thermomechanical properties, or the environmental properties (moisture, solvent and aggressive fluids resistance) of the composite laminate. In another embodiment, the open hole compression and compression after impact strength properties are only slightly affected or not affected by the insertion of the viscoelastic interleaf in the composite laminate.

The term "layup" as used herein has its ordinary meaning as known to those skilled in the art and may include one or more prepregs that are placed adjacent one another. In certain embodiments, the prepregs within the layup may be positioned in a selected orientation with respect to one another. In a further embodiment, the prepregs may optionally be stitched together with a threading material in order to inhibit their relative motion from a selected orientation. In additional embodiments, "layups" may comprise any combination of fully impregnated prepregs, partially impregnated prepregs, and perforated prepregs as discussed herein. Layups may be manufactured by techniques that may include, but are not limited to, hand layup, automated tape layup (ATL), advanced fiber placement (AFP), and filament winding.

The terms "fuselage skin," "fuselage stringer" and "fuselage frame" as used herein have their ordinary meaning as known to those skilled in the art and refer respectively to the aircraft main body panels, the circumferential frames creating its skeleton and the longitudinal stiffening reinforcing members. The combination of frames and stringers is used to give fuselage vessel the required stiffness and the sufficient amount of material to sustain all aircraft loading both from a static and from a fatigue point of view. For the stringer elements in particular, the main purpose is to divide the skin panel surface in an optimal configuration so that deformation of the surface is avoided. The stringers also contribute to preventing cracks from spreading in the skin panel. Examples of fuselage frames include IST frames, floating C frames with shear ties and floating Z frames with shear ties.

The terms "organic modifiers," "organic fillers," "inorganic modifiers" and "inorganic fillers" as used herein have their ordinary meaning as known to those skilled in the art and may include organic and inorganic compounds such as flow control additives, UV absorbers, fillers such as silica, graphite and boron nitride, clays such as mica, talc, and vermiculite, metal particles, deglossing agents, pigments, antioxidants, flame retardants, diluents, stabilizers, monomers, prepolymers, flexibility improvers, processing aids and lubricants (including fluoropolymer-based processing aids, mineral oils and waxes), nucleating agents, fiber strands, polymers, glass, ceramic and polymeric bubbles, metal particles micro and nanofillers such as core-shell particles, magnetic and dielectric nanocrystals, carbon nanotubes, carbon nanofibers, nanographite, nanoclays, nanosilica, nanoalumina, zirconia and titania nanoparticles, noble metal nanoparticles, conductive micro and nanoparticles, nanofibers and nanostrands or a combination thereof added to a nonwoven material, usually to improve it properties.

Standard manufacturing processes for making composite materials may be used. For example, in one embodiment, the composite is made using a typical fuselage skin/frame manufacturing process.

EXAMPLES

Example 1

Several commercially available thermoplastic elastomers have been evaluated to assess their damping efficiency ranges. A brief list of the evaluated materials and their corresponding properties is reported in Table 1.

TABLE 1

| Trade name | Grade | Polymer type | Tg. (° C.) | Tan δ |
|---|---|---|---|---|
| Arnitel | EL630 | TPC-E | 20.56 | 0.05 |
| Arnitel | EL550 | TPC-E | −80 | 0.05 |
| Arnitel | EL630 | TPE-E | −60.5 | 0.05 |
| Estane | 58245 | TPE-U | −22.7 | 0.40 |
| Hybrar | 7311 | TPE-S | −13.6 | 2.10 |
| Hybrar | 7125 | TPE-S | 10.9 | 1.20 |
| Hytrel | G3078 | TPC-ET | −40.4 | 0.40 |
| Hytrel | 4056 | TPC-ET | −20.32 | 0.20 |
| Hytrel | 4556 | TPC-ET | −40.43 | 0.16 |
| Hytrel | 5526 | TPC-ET | −8.06 | 0.14 |
| Kraton | FG1924 X | TPE-S | −41.1 | 1.50 |
| Kraton | MD-6455P | TPE-S | −60.1 | 2.00 |

TABLE 1-continued

| Trade name | Grade | Polymer type | Tg. (° C.) | Tan δ |
|---|---|---|---|---|
| Kraton | G-1730M | TPE-S | −38.8 | 0.90 |
| Kraton | G1642M | TPE-S | −31.2 | 1.50 |
| Kraton | D1113BT | TPE-S | −48.9 | 2.30 |
| Mobilon | MF100T | TPE-E | −54.8 | 0.45 |
| Mobilon | MF100T-TB | TPE-E | −17.6 | 0.32 |
| Onflex | U3565A | TPE-U | −19.0 | 0.30 |
| Onflex | V3085 | TPE-V | −28.3 | 0.20 |
| Onflex | U 5355A | TPE-U | −11.2 | 0.40 |
| Onflex | V1045A | TPE-V | −41.8 | 0.40 |
| Pebax | MX 1205 | TPE-E | −55.5 | 0.17 |
| Pebax | 3533 | TPE-E | −60.6 | 0.17 |
| Pebax | 2533 | TPE-E | −62.5 | 0.15 |
| Pebax | 4033 | TPE-E | −63.5 | 0.10 |
| Septon | 2002 | TPE-S | −35.1 | 0.60 |

TABLE 1-continued

| Trade name | Grade | Polymer type | Tg. (° C.) | Tan δ |
|---|---|---|---|---|
| Septon | 2063 | TPE-S | −38.15 | 1.60 |
| Septon | 8076 | TPE-S | −31.84 | 0.30 |

Polymers were selected according to their tans values and range of glass transition temperatures. Polymers with a tan values higher than 1.0, preferably between 1.0 and 1.6 and most preferably over 2 were selected.

Example 2

A styrenic thermoplastic elastomer and in particular of an hydrogenated styrene copolymer containing ethylene-proprylene flexible units, such as Kuraray Septon 2063, was used as, main component for the nonwovens manufacture disclosed in this example. Different percentages of Polypropylene (PP), Polyamide 6 (Nylon 6) or Polybutyleneterephthlate (PBT) were compounded with the selected thermoplastic elastomer (Septon 2063). A melt blowing process has been selected for the nonwovens manufacture. A schematic representation of the process is reported in FIG. 1. A list of nonwovens and their corresponding compositions and properties is reported in Table 2.

TABLE 2

| Nonwoven code | Composition | Weight (g/m²) | Thickness (µm) | Tensile strength (N/5 cm) MD | Air permeability cc/cm²/sec |
|---|---|---|---|---|---|
| 1 | 50:50 w/w Septon 2063/Polypropylene | 77.9 | 394 | 24.1 | 18.3 |
| 2 | 50:50 w/w Septon 2063/Polypropylene | 134.3 | 614 | 8.0 | 45.7 |
| 3 | 50:50 Septon 2063/Polypropylene | 79.2 | 403 | 12.2 | 42.7 |
| 4 | 50:50 w/w Septon 2063/Polypropylene | 85.1 | 350 | 17.1 | 60 |
| 5 | 50:50 w/w Septon 2063/Polypropylene | 80.9 | 301 | 10.7 | 52.8 |
| 6 | 50:50 w/w Septon 2063/Polypropylene | 48.9 | 175 | 9.1 | 57.1 |
| 7 | 50:50 w/w Septon 2063/Polypropylene | 48.5 | 206 | 8.0 | 85.8 |
| 8 | 50:50 w/w Septon 2063/Polypropylene | 78.6 | 330 | 10.0 | 82.5 |
| 9 | 70:30 w/w Septon 2063/Polybuthyleneterephthlate | 162.7 | 774 | 3.1 | 165 |
| 10 | 70:30 w/w Septon 2063/Nylon 6 | 196.8 | 1510 | 2.1 | 586 |

Example 3

In this example the suitability of the integrated acoustic damping material for infusion processes is demonstrated. In this example coupons were realized by bulk resin infusion using CYCOM 977-2 1000gsm HM Film and triaxial carbon fiber braided performs.

Three different nonwoven grades (3, 6 and 7 in Table 2), characterized by an area/weight ratio between 48.5 and 79.2 gsm and an air permeability between 40.3 and 85.8 cc/cm2/sec, were selected for the disclosed example.

Four coupons were manufactured using a ply-by-ply lay-up method (Table 4). The interleaf was placed in the mid-plane of the coupons. Coupon dimensions are reported in Table 3. Coupon 1 was manufactured without any viscoelastic interleaf and coded as unmodified baseline.

TABLE 3

| Specimen dimensions | |
|---|---|
| Length | ~250 mm |
| Thickness | ~3 mm |
| Width | ~160 mm |

For each coupon, the resin charge size has been calculated to meet a finished part resin content of 35±5 percent by weight.

The experiments showed that the selected nonwovens were suitable for the infusion process. A complete resin penetration was achieved. No dry areas were observed in the specimens. The correct resin content was achieved for all the manufactured coupons as shown in Table 4.

TABLE 4

| Coupon | Nonwoven | Resin content (%) in the infused specimen |
|---|---|---|
| 1 | = | 33.78 |
| 2 | 3 | 35.41 |
| 3 | 6 | 34.85 |
| 4 | 7 | 35.66 |

Example 4

Figure 2:
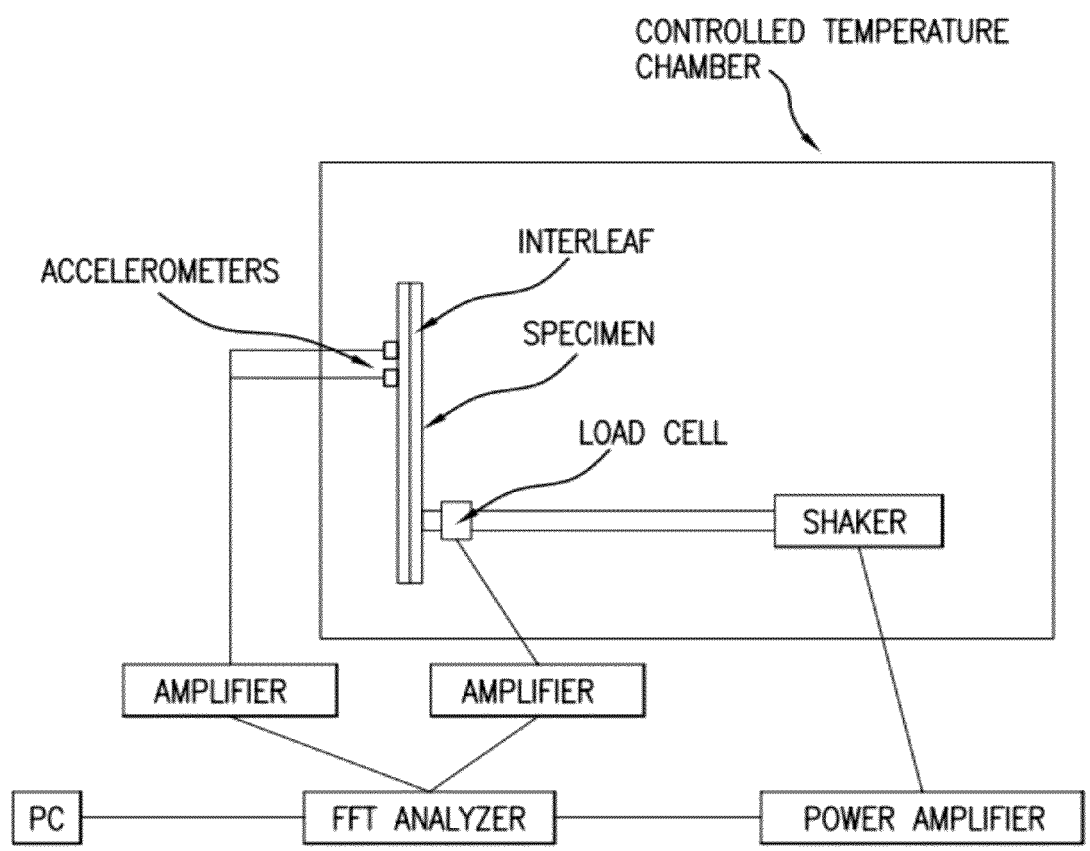
FIG. 2 is an illustration of the test apparatus used for measuring the loss factor of unmodified and nonwoven modified panels. Loss factor (η) is computed by the resonant peaks obtained from the amplitude ratio versus frequency spectrum of the dual channel FFT analyzer, which analyzes the output signals from the accelerometers (acceleration ratio and phase difference). Miniature accelerometers are used to measure the driving point acceleration at the shaker and the response of the test specimen.

The impact of the preferred nonwoven integrated material solution on the following composite properties has been evaluated:
a) Acoustic damping
b) Apparent Interlaminar shear strength
c) Compression after impact strength
d) Open Hole compression strength
e) Glass transition temperature Absorption measurements as a function of temperature were carried out by a resonance method. A schematic representation of the measuring system is shown in FIG. 2.

The specimen is forced to vibrate in a free configuration in a thermostatic chamber. Miniature accelerometers are used to measure the driving point acceleration at the shaker and the response of the test specimen. The output signals from the accelerometers are analyzed by a dual-channel fast Fourier transform spectrum analyzer. The analyzer determines the acceleration ratio and the phase difference of the two accelerometers, and also provides a random noise source to drive the shaker over a frequency range of 30 Hz to 10 KHz. The measured data are always sampled and rms-averaged. The displayed amplitude ratio versus frequency results in a number of resonant peaks from which the absorption (loss factor) is computed. The measurements were made over a temperature range of −50° C. to +20° C. at 10° C. intervals.

The test panels were prepared according to EN2565. Specimens' dimensions are reported in Table 5.

Prior to test cured specimens were stored at (23±2)° C.) and (50±5) % humidity in accordance with EN2743.

TABLE 5

| Specimen dimensions | |
|---|---|
| Length | 600 ± 1 mm |
| Width | 200 ± 1 mm |
| Thickness | ~1.65 mm |
| Lay-up | Quasi-isotropic |

Acoustic tests coupons were manufactured from CYCOM® 977-2-34-24IMS unidirectional tape. Nonwoven 3 (Table 2) was selected as interleaf for the example and prepregged with a CYCOM 977-2 HM 94gsm film. The prepregged interleaf was then laid up at the mid plane of the specimen. For comparison purposes a specimen not containing any interleaf was manufactured and coded as "unmodified baseline."

Figure 3:
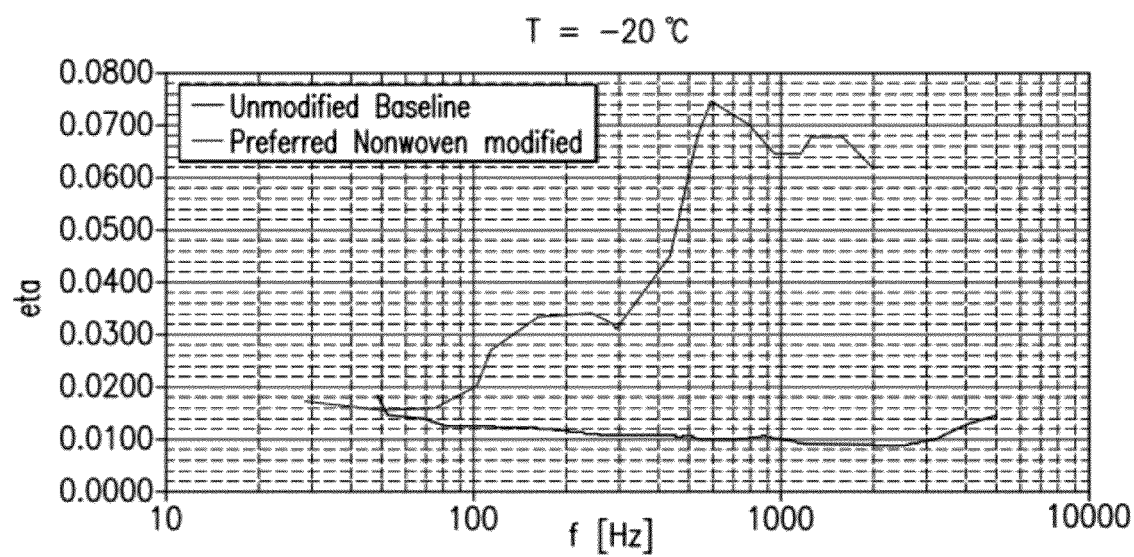
FIG. 3 illustrates the damping performance of nonwoven modified composite versus frequency at −20° C. as described in Example 4. The higher the loss factor the greater the dissipated energy. Thus, the modal analysis showed improved damping properties in the range of frequencies between about 100 and about 5000 Hz and in a wide range of temperatures, for example, from −50° C. to +20° C., which includes the −20° C. behavior shown.
Figure 4:
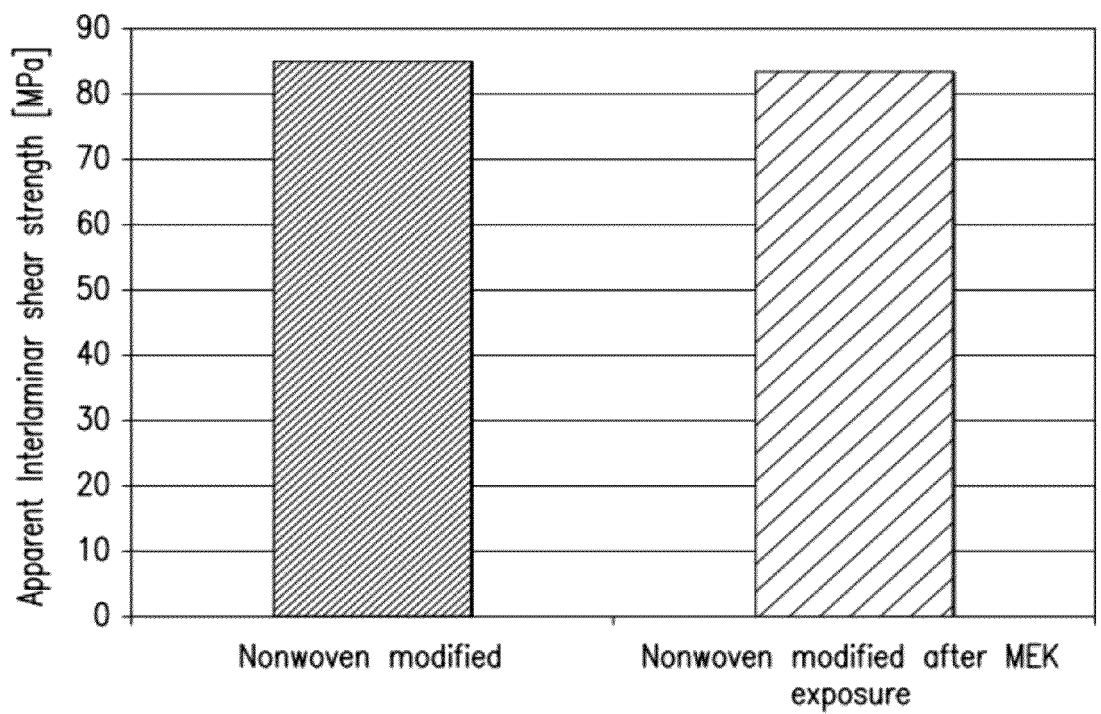
FIG. 4 illustrates the solvent resistance of nonwoven modified laminates using a short beam shear test, which shows apparent interlaminar strength of the interleaf modified composite before and after methyl ethyl ketone (MEK) conditioning according to Example 4b. The apparent interlaminar shear strength is not substantially affected by methyl ethyl ketone (MEK) conditioning under conditioning conditions of 1 hour at room temperature.

The disclosed nonwoven integrated material specimen resulted in excellent acoustic damping performance in the temperature range between −50° C. and 20° C. and in the frequency range between 30 and 5000 Hz as shown in Table 6. The integrated material solution showed a significant improvement in acoustic damping properties if compared to the unmodified baseline as shown in FIG. 3.

TABLE 6

| Frequency (Hz) | η(Loss factor) | | | | | | | |
|---|---|---|---|---|---|---|---|---|
| | −50° C. | −40° C. | −30° C. | −20° C. | −10° C. | 0° C. | 10° C. | 20° C. |
| 30 | 0.029659 | 0.024884 | 0.021369 | 0.017299 | 0.017796 | 0.016919 | 0.018449 | 0.022231 |
| 50 | 0.024247 | 0.02382 | 0.020797 | 0.015422 | 0.017421 | 0.017834 | 0.019663 | 0.021713 |
| 75 | 0.017989 | 0.022756 | 0.020225 | 0.015968 | 0.022802 | 0.019977 | 0.021552 | 0.020834 |
| 100 | 0.013062 | 0.022484 | 0.024257 | 0.020209 | 0.025529 | 0.022525 | 0.022367 | 0.016263 |
| 150 | 0.01065 | 0.022091 | 0.029561 | 0.026828 | 0.024995 | 0.021594 | 0.022389 | 0.012501 |
| 200 | 0.011543 | 0.021701 | 0.037767 | 0.033381 | 0.02447 | 0.019462 | 0.022411 | 0.012673 |
| 250 | 0.012059 | 0.021756 | 0.039757 | 0.033992 | 0.024211 | 0.016108 | 0.020219 | 0.012845 |
| 300 | 0.012525 | 0.021789 | 0.040965 | 0.032213 | 0.02323 | 0.020308 | 0.021309 | 0.021263 |
| 350 | 0.011419 | 0.021097 | 0.036746 | 0.031074 | 0.023759 | 0.02933 | 0.024431 | 0.031797 |
| 400 | 0.011055 | 0.021613 | 0.035966 | 0.036358 | 0.02941 | 0.041794 | 0.028337 | 0.03069 |
| 500 | 0.010702 | 0.022691 | 0.035915 | 0.045019 | 0.03781 | 0.048705 | 0.029584 | 0.02682 |
| 600 | 0.01127 | 0.023633 | 0.036783 | 0.057785 | 0.046602 | 0.060244 | 0.032412 | 0.032344 |
| 650 | 0.011616 | 0.02385 | 0.037996 | 0.068467 | 0.045692 | 0.055543 | 0.035751 | 0.034929 |
| 700 | 0.011869 | 0.024018 | 0.040352 | 0.074705 | 0.044889 | 0.04805 | 0.036608 | 0.036295 |
| 800 | 0.011776 | 0.024154 | 0.042106 | 0.07027 | 0.040032 | 0.047659 | 0.031946 | 0.030918 |
| 900 | 0.011776 | 0.024041 | 0.04672 | 0.064629 | 0.03821 | 0.058363 | 0.027516 | 0.03181 |
| 1000 | 0.011942 | 0.024068 | 0.06475 | 0.035522 | 0.066499 | 0.025302 | 0.032759 |
| 1000 | 0.011942 | 0.024068 | 0.04726 | 0.06475 | 0.035522 | 0.066499 | 0.025302 | 0.032759 |
| 1250 | 0.012236 | 0.025721 | 0.050315 | 0.067795 | 0.037927 | 0.062027 | 0.026946 | 0.032925 |
| 1500 | 0.012329 | 0.027786 | 0.044625 | 0.068021 | 0.044035 | 0.056166 | 0.02896 | 0.029003 |
| 2000 | 0.012686 | 0.030923 | 0.034065 | 0.061731 | 0.048751 | 0.04987 | 0.031932 | 0.027605 |
| 2500 | 0.01367 | 0.032956 | 0.028768 | 0.056415 | 0.050988 | 0.046309 | 0.033678 | 0.0327 |
| 3000 | 0.015765 | 0.033758 | 0.031322 | 0.052829 | 0.048099 | 0.038688 | 0.035252 | 0.0388 |

TABLE 6-continued

| Frequency | η(Loss factor) | | | | | | | |
|---|---|---|---|---|---|---|---|---|
| (Hz) | −50° C. | −40° C. | −30° C. | −20° C. | −10° C. | 0° C. | 10° C. | 20° C. |
| 4000 | 0.018263 | 0.031645 | 0.036402 | 0.050927 | 0.046541 | 0.030753 | 0.035376 | 0.042116 |
| 5000 | 0.020243 | 0.02699 | 0.038776 | 0.048757 | 0.044155 | 0.023979 | 0.035966 | 0.041454 | b)

The apparent shear strength of a specimen was tested in collection as a simple beam according to EN2563. A bar rests on two supports on the force applied by means of a loading nose midway between the supports and was measured in accordance with the following formula:

$$\tau = \frac{3 \cdot P_R}{4bh}$$

where:

τ is the apparent shear stress, in MPa
$P_R$ is the maximum force at the moment of the first failure, in N
b is the width of the specimen, in mm
h is the thickness of the specimen, in mm The apparent interlaminar shear strength of the nonwoven modified laminate was measured before and after MEK immersion. In the initial conditions specimens were conditioned according to EN 2743.

For tests after MEK immersion, conditioning was carried out according to EN 2489 Test panels were manufactured from CYCOM 977-2-34-24IMS unidirectional tape. Test specimens were taken in panels prepared according to EN2565. Specimen dimensions are reported in Table 7. Five coupons were tested before immersion and other five after immersion. The length direction of the specimens was parallel to the fiber orientation. Nonwoven 3 (Table 2) was selected as interleaf for the example and prepregged with CYCOM 977-2 HM 94gsm film. The prepregged interleaf was then laid-up at the mid plane of the specimens.

TABLE 7

| Specimen dimensions | |
|---|---|
| Length | 20 ± 0.25 mm |
| Width | 10 ± 0.2 mm |
| Thickness | 2 ± 0.2 mm |

The MethylEthylKetone conditioning did not affect the calculated apparent interlaminar strength of the interleaf-modified coupons. In particular in one embodiment the interlaminar shear strength was 84.59 MPa, and after the immersion for one hour in solvent was 83.34 MPa as shown in FIG. 3.

c)

The compression after impact test aims to determine the low speed impact resistance characteristics of fiber reinforced plastics. The method measures material response to a specific set of impact parameters to allow comparison between materials.

Interleaf modified specimen is subject to impact at a defined impact energy and the compression strength is measured according to EN 6038. The dent depth and determined area were measured.

Test panels were manufactured from CYCOM 977-2-34-24IMS unidirectional tape. The interleaf modified test panels were prepared in accordance with EN 2565 method B for carbon-reinforced laminates. Nonwoven 3 (Table 2) was selected as interleaf for the example and prepregged with a CYCOM 977-2 HM 94gsm film. The prepregged interleaf was then laid up at the midplane of the specimens. A quasi-isotropic lay-up and approximately 4 mm specimens were used for the test. Dimensions and tolerances are defined in Table 8.

The interleaf-modified specimens were impacted with a 30 J energy and the dent depth measured. The ultrasonic scan was performed to determine the damage length, width and area.

The conditioning was carried out after impact. The test was performed at 23±2 mm 50±5% relative humidity.

A crosshead of 0.5 mm/min was selected. Load was continuously recorded as a function of time and the break failure load ($P_R$). The compression strength after impact at a specific impact energy level E. is defined by the following formula:

$$\sigma_r = \frac{P_r}{w \cdot t}(MPa)$$

Where $P_r$ is the break failure load (N)
w is the specimen width (mm)
t is the thickness of the specimen (mm)
The dimensions of the specimen are reported in Table 8

TABLE 8

| Specimen dimensions | |
|---|---|
| Length | 150 ± 0.2 mm |
| Width | 100 ± 0.2 mm |
| Thickness | ~4 mm |
| Lay-up | Unidirectional |

Nonwoven 3 (Table 2) was laid up in the mid plane of each coupon.

Figure 5:
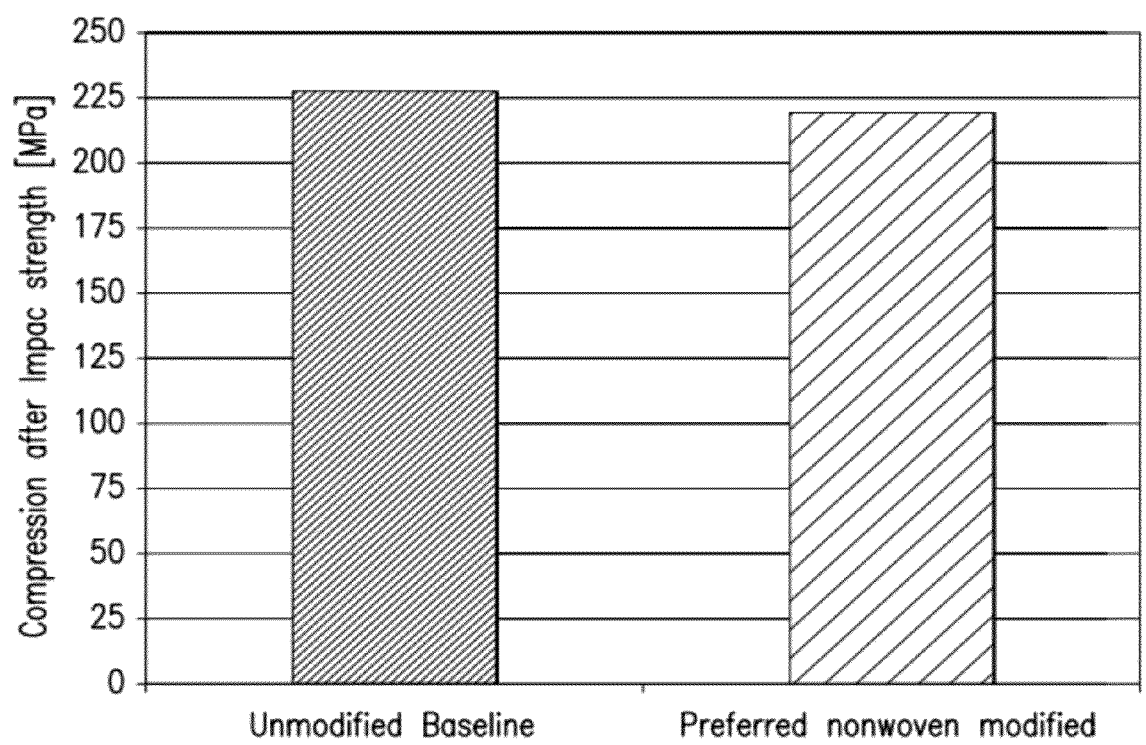
FIG. 5 illustrates the compression after impact strength of a nonwoven modified composite of one embodiment of the invention is almost unaltered in comparison to an unmodified composite as described in Example 4c.
Figure 6:
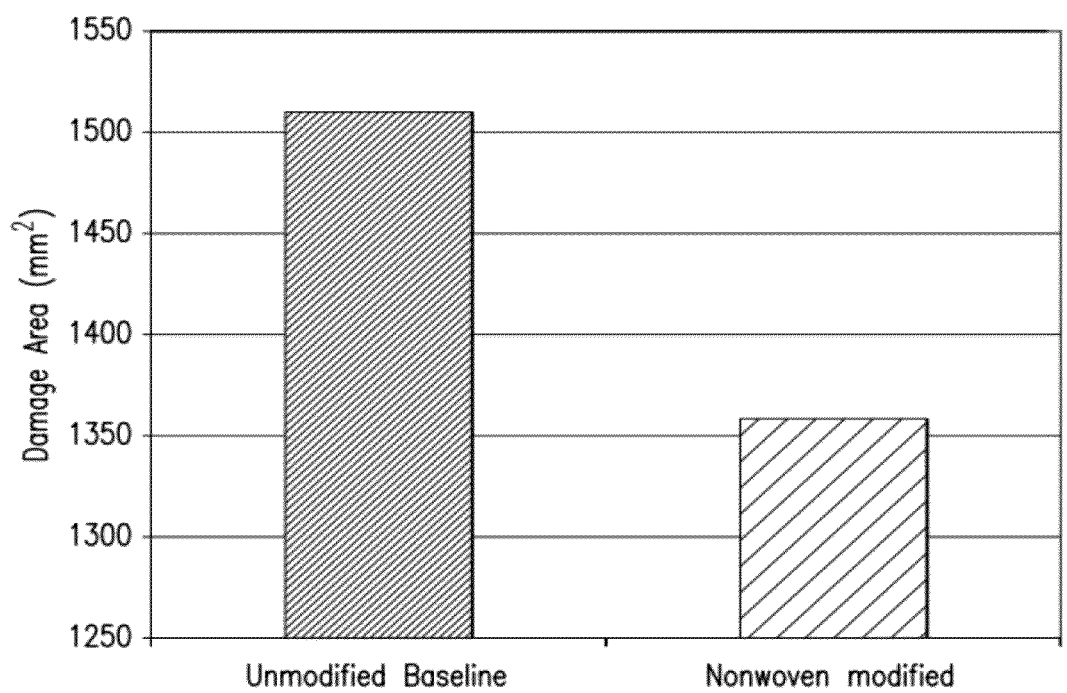
FIG. 6 illustrates that the damage area after a 30 J impact of a nonwoven modified composite of one embodiment of the invention is reduced in comparison to an unmodified composite as described in Example 4c.

The use of the preferred nonwoven in the integrated composite structure resulted in a minimal drop in compression after impact strength as showed in FIG. 5. In addition the modification determined a reduction in damage area if compared to the unmodified coupon as shown in FIG. 6.

Open hole compression test is a method to determine the open hole tensile strength of composites with unidirectional reinforcement. The interleaf modified open hole specimens are tested in tension in order to determine the tension mechanical properties of the laminate.

A crosshead speed of 2±0.2 mm/min was selected. The load was continuously recorded as function of the crosshead displacement. The normalized tensile open hole compression strength was calculated by the maximum load experienced by the specimen divided by the cross section area within the gauge length using the reported formula:

$$\sigma_{ohc} = \frac{P_u}{t_n \cdot W}(MPa)$$

Where $P_u$ is the maximum load (N)
w is the specimen width (mm)
$t_n$ is the nominal thickness (cured ply thickness specified in the relevant material specification multiplied by the number of plies in the test laminate) (mm)

Test panels were manufactured from CYCOM 977-2-34IMS unidirectional tape. Test panels were prepared in accordance with EN 2565 method B for carbon fiber reinforced laminates.

A quasi-isotropic lay-up and approximately 4 m specimens were used for the test. The variation in the thickness measurements for any laminate was within ±2% of mean measured thickness. Nonwoven 3 (Table 2) was selected as interleaf for the example and prepregged with a CYCOM 977-2 HM 94gsm film. The prepregged interleaf was then laid-up at the mid plane of the specimens. For comparison purposes coupons not including any nonwoven interleaf were manufactured and coded as unmodified baseline.

The panels were subjected to Non-Destructive Testing (NDT) (e.g. C-scan) to establish freedom from detectable defects.

The hole machining complied with the requirements of AIPS 01-02-005. Six test specimens were tested.

The specimens were tested at (23±2)° and conditioned according to EN2823.

The dimensions of the specimen are reported in Table 9.

TABLE 9

| Specimen dimensions | |
|---|---|
| Length | 180 ± 0.1 mm |
| Half length | 90 ± 0.05 mm |
| Thickness | ~4 mm |
| Width | 32 ± 0.2 mm |
| Half width | 16 ± 0.1 mm |
| Hole Diameter | |
| Min. | 6.339 |
| Max. | 6.384 |

Figure 7:
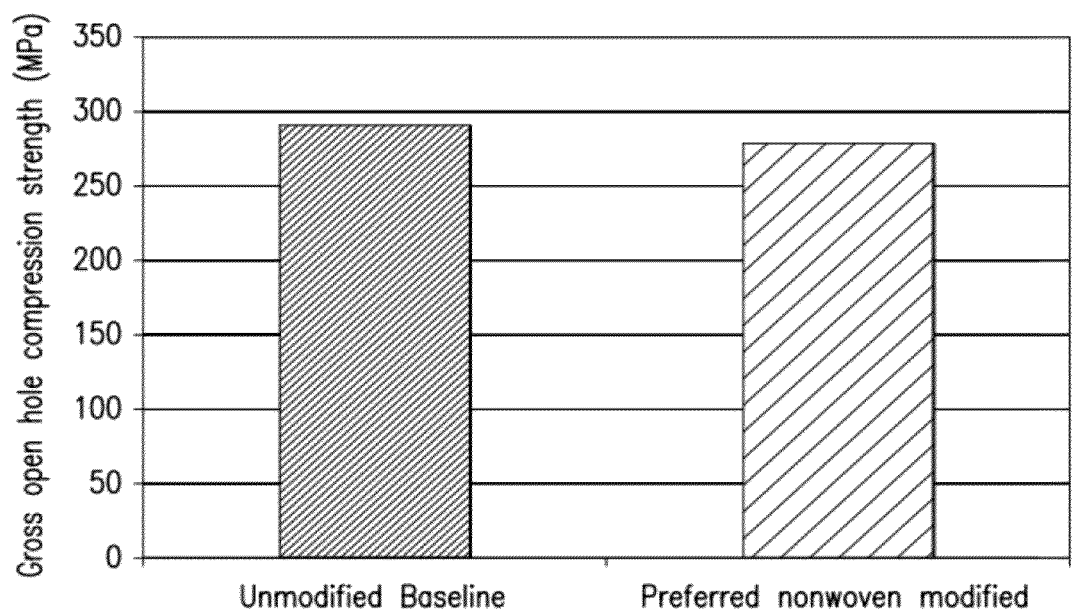
FIG. 7 illustrates the gross open hole compression strength of a nonwoven modified composite according to one embodiment of the invention is almost unaltered in comparison to an unmodified composite as described in Example 4d.

The insertion of the nonwoven in the midplane of the integrated composite structure resulted in a minor drop in open hole compression strength if compared to the unmodified baseline as shown in FIG. 7.
e)

The impact of the nonwoven interleaf on the laminate thermal properties was evaluated by Dynamic Mechanical Analysis (DMA) using a multifrequency strain controlled test. A sinusoidal force deforms the specimen at a constant amplitude over a single frequency while the material is heated at a constant rate. The magnitude of the applied stress and the resultant strain are used to calculate the stiffness and therefore the modulus of the material under stress. By measuring the time lag in the displacement compared to the applied force the damping properties of the material was determined. The time lag was reported as a phase lag (an angle). The damping is called tan d, representing the tangent of the phase lag. DMA was performed in the range of temperatures between about 50° C. and 260° C., with a heating rate of 5±0.2° C./min and about 1 Hz frequency.

Test panels were manufactured from CYCOM 977-2-34IMS unidirectional tape. The test panels were prepared according to EN2565. Specimen dimensions are reported in Table 10.

TABLE 10

| Specimen dimensions | |
|---|---|
| Length | 40 ± 0.4 mm |
| Half length | 10 ± 0.4 mm |
| Thickness | 2 ± 0.2 mm |

Nonwoven 3 (Table 2) was selected as interleaf for the example and prepregged with CYCOM 977-2 HM 94gsm film. The prepregged interleaf was then laid-up at the mid plane of the specimens.

Prior to test cured specimens were stored at (23±2° C.) and (50±5) % humidity in accordance with EN2743.

The glass transition temperature is defined as the temperature where the sample exhibits a dramatic change in mechanical and damping behavior with increasing temperature when subjected to an oscillating displacement. The Tg onset is defined as the temperature as the temperature intersection of extrapolated tangents drawn from points on the storage modulus curve before and after the onset of the glass transition event. The test was performed using a single cantilever-bending mode. Three specimens were tested and Tg results were within ±2° C. of their mean.

Figure 8:
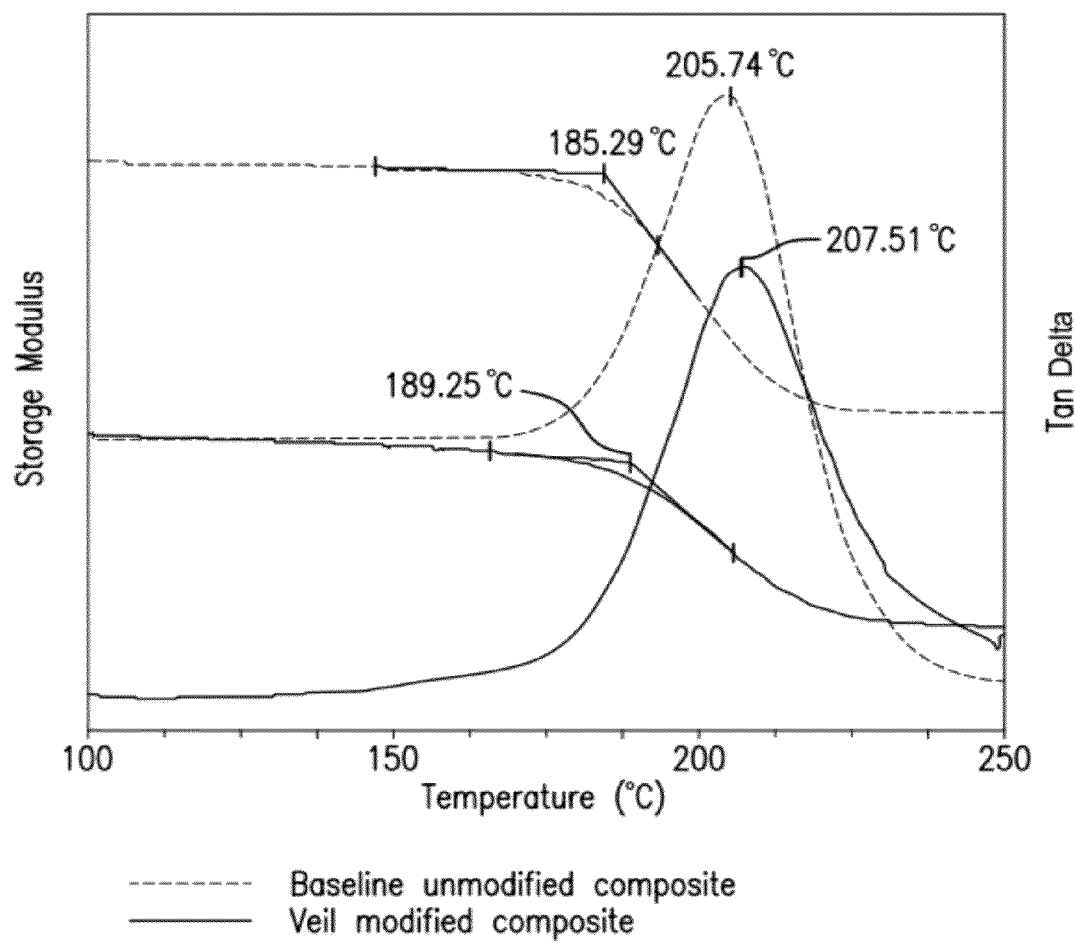
FIG. 8 illustrates the effect of the nonwoven modified laminate on the thermal properties, namely, the glass transition temperature (Tg) of the laminate, using a dynamic mechanical analysis (DMA) of an unmodified laminate and an embodiment of a non-woven, interleaf modified laminate as described in Example 4. The DMA analysis confirmed that the insertion of the disclosed nonwoven material does not substantially affect the thermal properties, such as Tg, of the modified laminate as described in Example 4e.

The use of the preferred nonwoven solution does not substantially affect the glass transition temperature of the integrated structure as shown in FIG. 8. Differences of less than 1° C. were observed between the nonwoven modified and unmodified specimens.

Example 4

Comparative example of the peel strength of the disclosed nonwoven integrated material versus a Smactane® (available from Smac Toulon France) continuous film modified composite.

The Peel Test measures the strength required to pull apart a bonded surface. After the sample was measured for thickness, it was placed in a fixture in a universal tester. The specimen was pulled at the specified speed until either the part or the bond fails. Types of failure were noted as cohesive, adhesive, or substrate failure.

Figure 10:
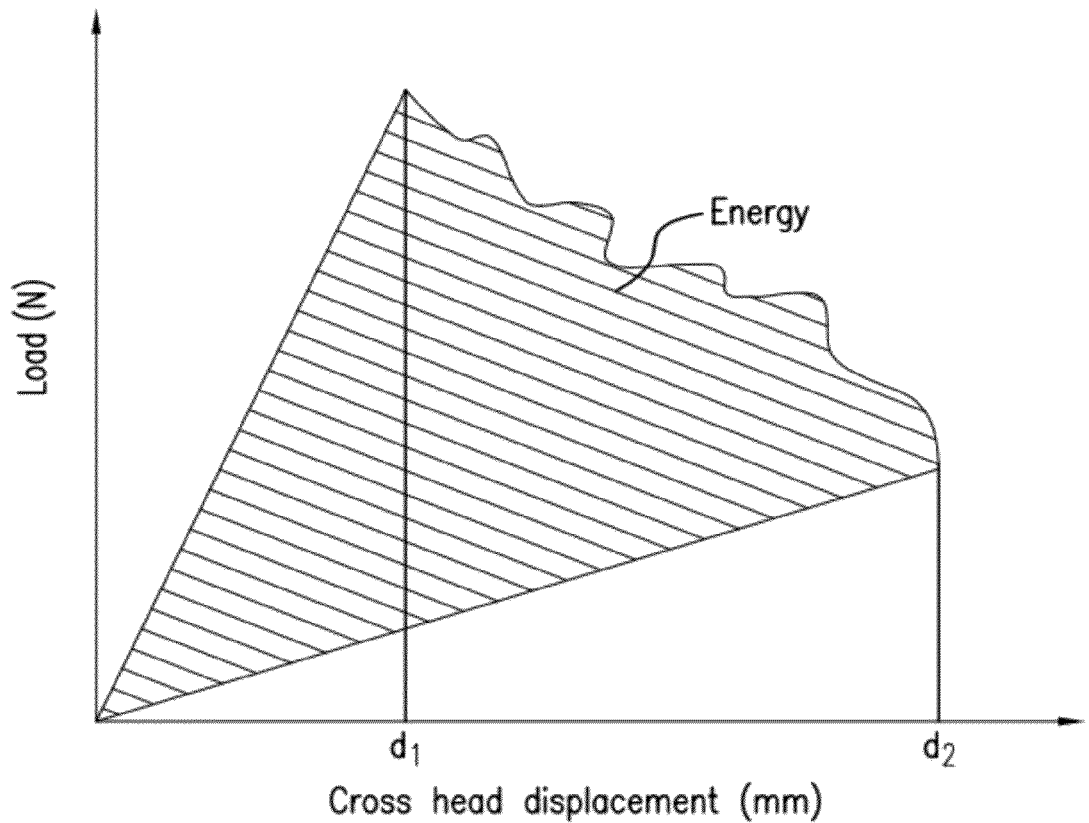
FIG. 10 illustrates the load cross head displacement diagram as discussed in Example 5.
Figure 11:
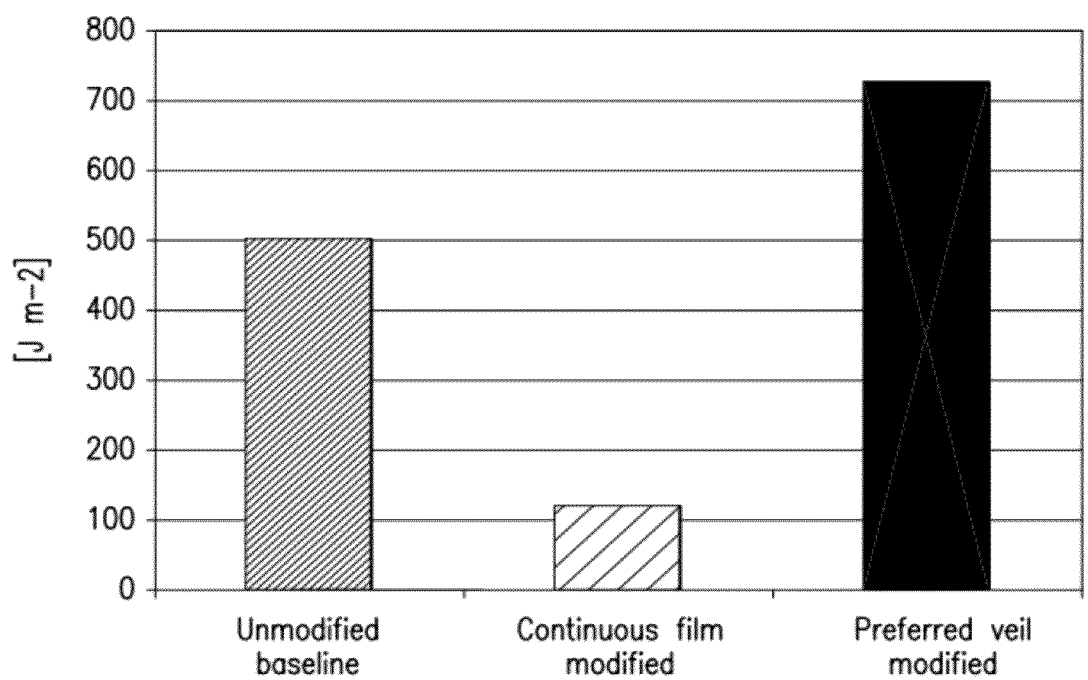
FIG. 11 illustrates the peel strength data for an embodiment of the damped composite of the present disclosure and comparative samples generated by the peeling test described in Example 5: A) baseline; B) continuous film modified composite; and C) damped composite material of one embodiment the present disclosure. This figure represents the amount of energy, normalized by the incipient fracture plane, which is required to initiate a delamination crack. The structure of the interleaf resulted in higher peel strength values.

The precracked specimen was loaded continuously by peel-forces until a total propagated crack length of approximately 100 mm was achieved. During the crack propagation, the loads and cross head displacement of the test machine were recorded continuously. The peel strength was calculated from the propagated crack length and the applied energy determined from the load-cross head displacement diagram as shown in FIG. 10.

Figure 9:
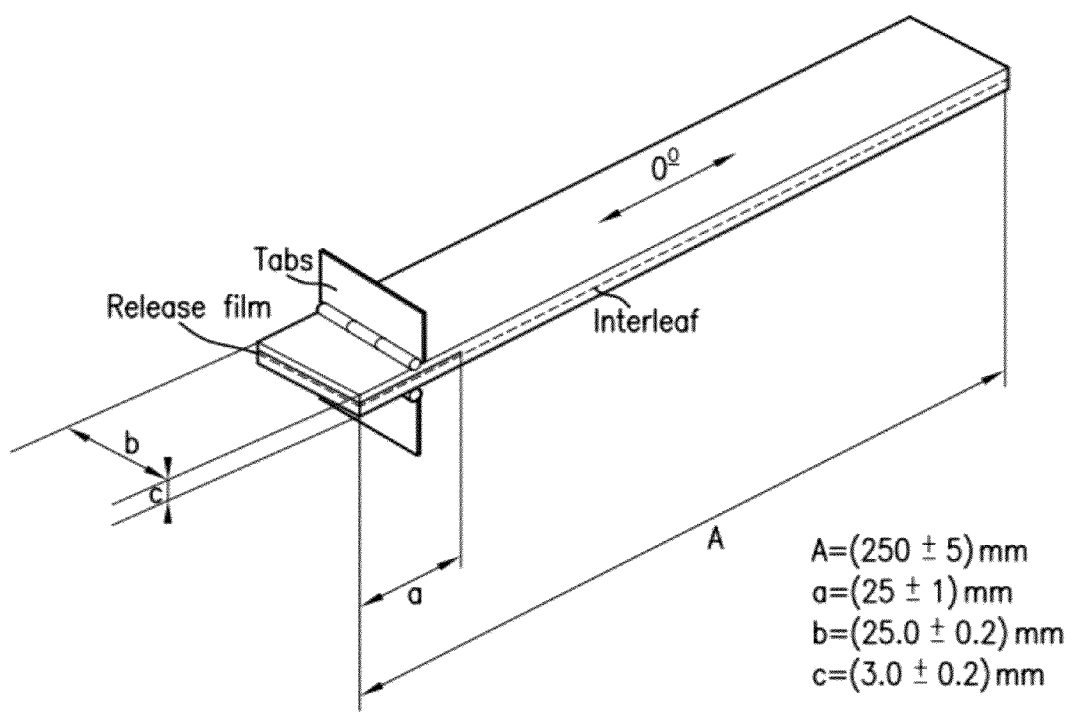
FIG. 9 illustrates an example of the test specimen configuration used in generating the Peel strength data of Example 5.

The dimensions of the Peel Test specimens of FIG. 9 are reported in Table 11.

TABLE 11

| Specimen dimensions | |
|---|---|
| Length (L) | 205.0 ± 5 mm |
| Initial Crack length (l) | 25.0 ± 1 mm |
| Width (w) | 25.0 ± 0.2 mm |
| Thickness (t) | 3.0 ± 0.2 mm |

The fiber direction for the tape was 0° to the specimen length.

Test panels were manufactured from CYCOM 977-2-34-24IMS unidirectional tape. The test panels were prepared according to EN2565. Nonwoven 3 (Table 2) was selected as interleaf for the example and prepregged with CYCOM 977-2

HM 94gsm film. The prepregged interleaf was then laid-up at the mid plane of the specimens.

The initial crack was introduced using a double layer of polytetrafluoroethylene (PTFE) release film with dimensions of the crack length was placed at the mid-plane of the laminate between the viscoelastic interleaf and the tape ply immediately adjacent to it.

The nonwoven interleaf and the continuous film used for the comparative example and their corresponding features are reported in Table 12:

TABLE 12

| Interleaf | Thickness (μm) | Weight g/m2 |
|---|---|---|
| Smactane ® | 200 | 220 |
| Nonwoven 3 | 403 | 80 |

Specimens were tested dry in the as cured state at room temperature, after conditioning according to EN 2743 Testing.

Testing

The specimen was aligned in the test fixture. The incorporated release film was loaded until an initial crack length of about 10-15 mm was achieved. The specimen was loaded constantly with a crosshead speed of 10 mm/min until a total crack length of about 100 mm was achieved. Load and cross head displacement were recorded.

The following formula was used to calculate the peel strength.

$$PS = \frac{A}{aw} \times 10^6$$

PS is the peel strength
A is the energy to achieve the total propagated crack length (FIG. 10)
a is the propagated crack length
w is the width of the specimen The use of a continuous film interleaf, as in the case of the Smactane® modified coupon, results in a significant drop in peel strength due to the isotropic nature of the interleaf. The film acts as a continuous barrier in the composite structure. On the contrary when the preferred nonwoven interleaf was placed in the midplane of the coupon excellent peel strength values were recorded. The creation of a tailored interface between the resin and the nonwoven results in a clear improvement in strength values while maintaining the excellent acoustic damping properties.

Example 5

In this comparative example different plasma treatments were used to modify the surface of the nonwoven. Coupons were prepared as in Example 5. Peel strength was calculated as in Example 5.

Test panels were manufactured from CYCOM 977-2-34-24IMS unidirectional tape. The test panels were prepared according to EN2565. Nonwoven 3 (Table 2) was selected as interleaf for the comparative example and prepregged with CYCOM 977-2 HM 94gsm film. The prepregged interleaf was then laid-up at the mid plane of the specimens.

Treatment conditions are reported in Table 13.

TABLE 13

| Treatment conditions | |
|---|---|
| Line speed | ~3-10 m/min |
| Nozzle/sample gap | ~10-15 mm |
| Power | ~1-3 KW |
| Dyne | ~40-70 |

A complete list of the analyzed coupons and plasma treatments is reported in Table 14.

The surface tension after the plasma treatment was measured by test inks. The measure is based on the principle that if the liquid wets the surface after ink application, the surface tension of the material being tested is higher than the corresponding test value. The test is repeated with the next higher test value until wetting fails to occur. Accordingly, the surface tension of the material corresponds to the value of the test ink that last wetted it for at least 2 seconds.

TABLE 13

| Sample code | Interleaf | Plasma treatment | Gas | Surface Tension Dyne/cm | Peel strength (J/m²) |
|---|---|---|---|---|---|
| Unmodified baseline | — | — | — | — | 500 |
| 1 | 3 | Atmospheric | Air 1 | 52 | 600 |
| 2 | 3 | Atmospheric | Air 2 | >70 | 924 |
| 3 | 3 | Atmospheric | Nitrogen/Hydrogen 90:10 | 54 | 632 |

Figure 12:
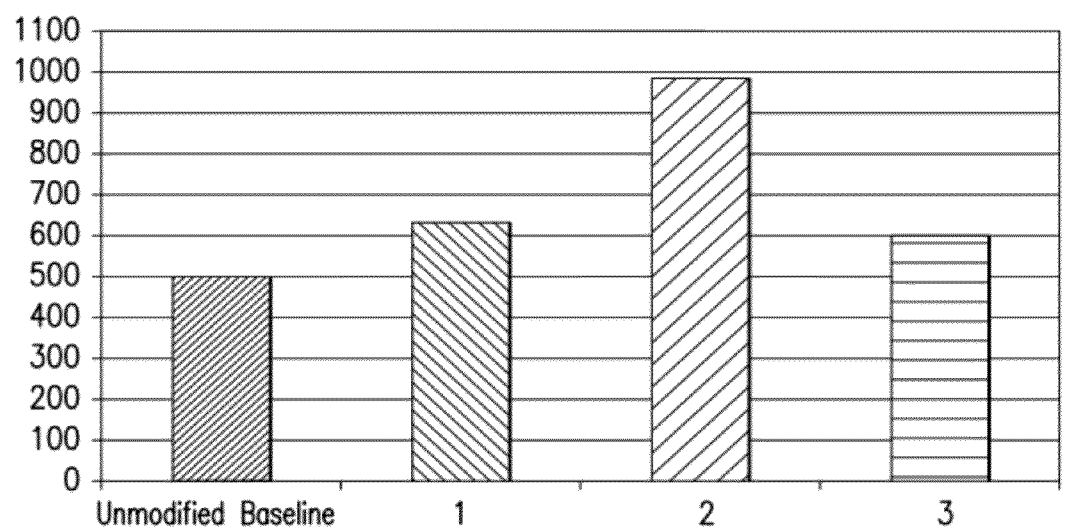
FIG. 12 illustrates the peel strength data for different plasma treated embodiment of the damped composite of the present disclosure and comparative samples generated by the peeling test described in Example 6. Increments between the 20 and 100% were achieved for the plasma treated nonwoven modified composites if compared to the unmodified laminate.

An improvement between the 20 and 96% in peel strength has been observed for the plasma modified nonwoven interleaved structures after the treatment if compared to the unmodified baseline coupon as shown in FIG. 12.

Example 6

Comparative example of infusion process between nonwoven and continuous film interleaved composite materials.

The infusion processes were carried out as described in Example 3. Nonwoven 3 (Table 2) and a continuous film based on the same material composition and thickness have been used as interleaf for the embodiments disclosed in this example.

Figure 13A:
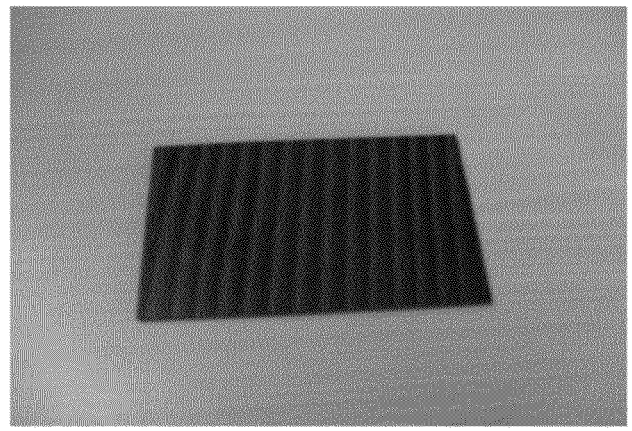
FIG. 13 illustrates the efficiency of an integrated nonwoven structure for resin infusion processes (A) compared to the continuous film modified structure (B). A perfect resin penetration has been obtained in the case of the nonwoven embodiment disclosed while wide dry areas are clearly visible for the continuous film panel.
Figure 13B:
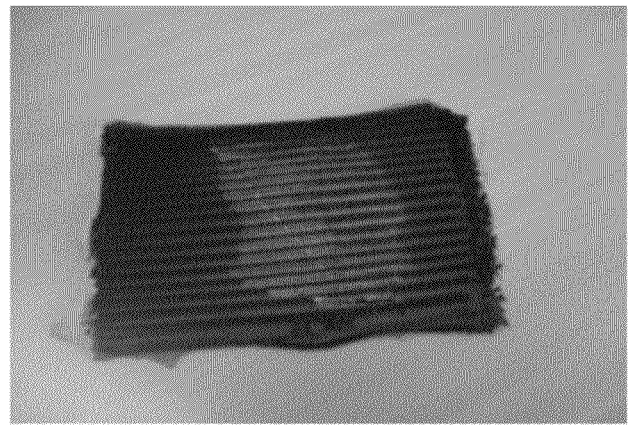
Figure 14:
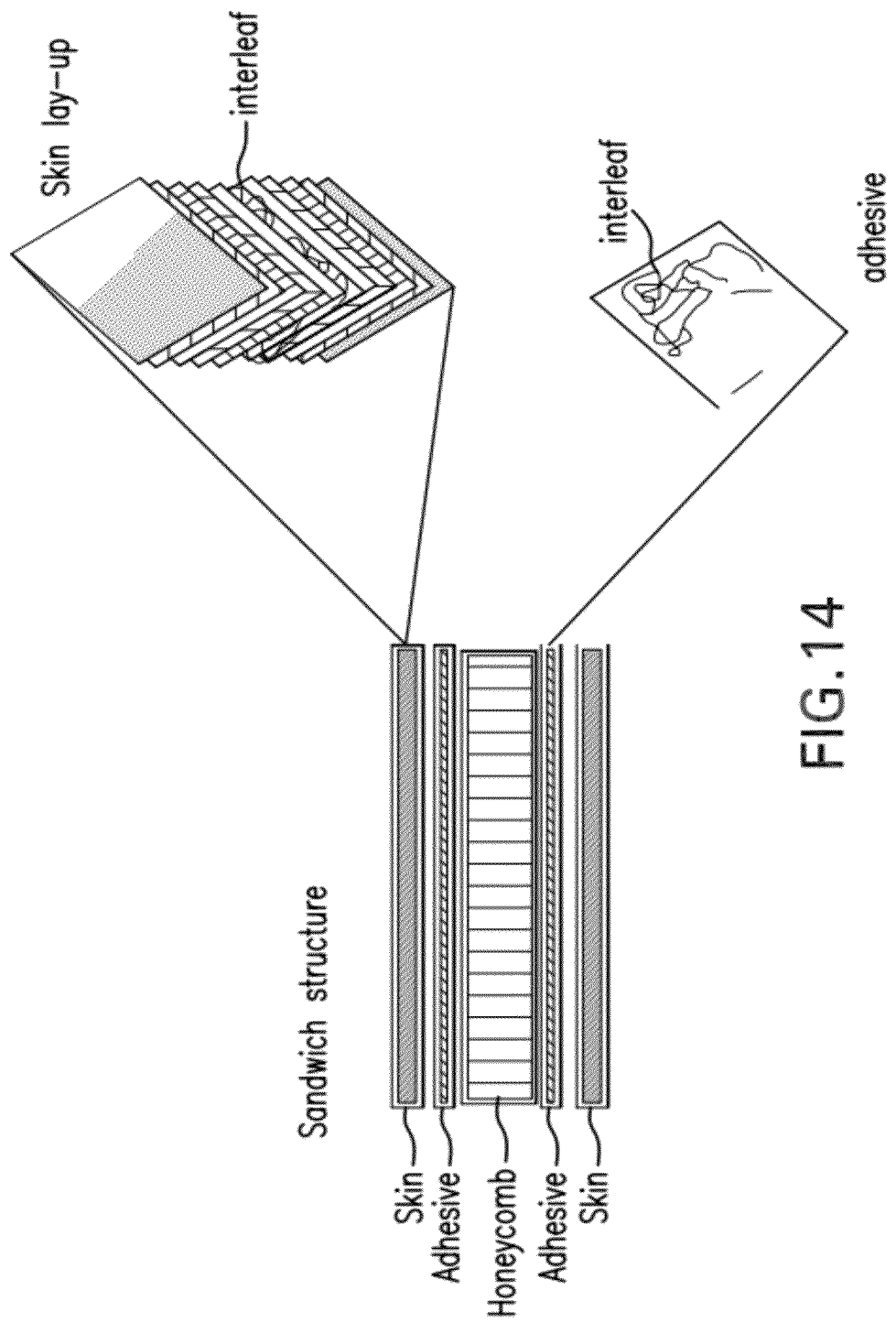
FIG. 14 illustrates a perspective view of a section of one of the sandwich structures disclosed in the present invention

The continuous film acts as a flow barrier and prevents the complete coupon impregnation. A large dry area is clearly visible on the surface of the continuous film modified coupon as shown in FIG. 13b. On the contrary, the use of the preferred nonwoven integrated material solution resulted in a perfectly impregnated structure containing the calculated resin content as shown in FIG. 13a.

What is claimed is:

1. A cured or uncured structural composite material comprising
    a structural component in a form of a plurality of layers of textile that comprises structural fibers;
    a thermosetting resin component; and
    a viscoelastie interleaf positioned between a pair of adjacent layers of to tile, said viscoelastic interleaf comprising at least one thin layer of nonwoven material, which is comprised of thermoplastic elastomer fibers;
    wherein the viscoelastic interleaf and structural component are partially or completely impregnated with the thermosetting resin component; and wherein the resin component has a glass transition temperature $T_g$ that is higher than that of the viscoelastie interleaf, and wherein the thermoplastic elastomer fibers in said nonwoven material are made of at least on polymer selected from the group consisting of styrenic thermoplastic elastomers, and a blend thereof.

2. The structural composite material as in claim 1 wherein the thermosetting resin component comprises an epoxy.

3. The structural composite material as in claim 1 wherein the structural fibers comprise carbon fibers.

4. The structural composite material of claim 1 wherein the viscoelastic interleaf is completely impregnated with the thermosetting resin component.

5. The structural composite material of claim 1, wherein thermoplastic elastomer fibers in the nonwoven material are made of a styrenic thermoplastic elastomer which is a block copolymer having an elastomeric segment with a lower $T_g$ and styrenic segments with higher $T_g$, and which forms a microphase separated structure at room temperature.

6. The structural composite material of claim 1, wherein the viscoelastic interleaf has been treated by plasma to achieve a surface tension of at least 35 dyne/cm on both the sides.

7. A cured or uncured composite sandwich structure comprising a first skin and a second skin; and a honeycomb structure between the first skin and the second skin;

wherein each of the first and second skins comprises a plurality of layers of textile comprising structural fibers, an viscoelastie interleaf positioned between a pair of adjacent layers of the textile, and a thermosetting resin component, wherein the viscoelastic interleaf comprises at least one thin layer of nonwoven material, which comprises thermoplastic elastomer fibers, and the thermosetting resin component has a glass transition temperature $T_g$ that is higher than that of the viscoelastie interleaf, wherein the viscoelastic interleaf and the layers of textile are partially or completely impregnated with the thermosetting resin component, and wherein the thermoplastic elastomer fibers of the nonwoven material are made of at least one polymer selected from the group consisting of: styrenic thermoplastic elastomers, and a blend thereof.

8. The cured or uncured composite sandwich structure as in claim 7 wherein the viscoelastic interleaf is coated at least on one side with a structural adhesive formulation.

\* \* \* \* \*